US012812710B2

(12) United States Patent
Sugaya et al.

(10) Patent No.: US 12,812,710 B2
(45) Date of Patent: Nov. 24, 2026

(54) COMMUNICATION DEVICE, COMMUNICATION METHOD, AND VEHICLE

(71) Applicant: Sony Group Corporation, Tokyo (JP)

(72) Inventors: Shigeru Sugaya, Tokyo (JP); Hiromasa Uchiyama, Tokyo (JP); Kazuyuki Shimezawa, Tokyo (JP); Ken Tanaka, Tokyo (JP); Kosuke Aio, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 433 days.

(21) Appl. No.: 18/558,532

(22) PCT Filed: Feb. 1, 2022

(86) PCT No.: PCT/JP2022/003739

§ 371 (c)(1),
(2) Date: Nov. 2, 2023

(87) PCT Pub. No.: WO2022/239319

PCT Pub. Date: Nov. 17, 2022

(65) Prior Publication Data

US 2024/0224359 A1 Jul. 4, 2024

(30) Foreign Application Priority Data

May 10, 2021 (JP) ................................ 2021-079533

(51) Int. Cl.

| | |
|---|---|
| ***H04W 76/15*** | (2018.01) |
| ***H04W 52/06*** | (2009.01) |
| *H04W 88/10* | (2009.01) |

(52) U.S. Cl.
CPC .......... *H04W 76/15* (2018.02); *H04W 52/06* (2013.01); *H04W 88/10* (2013.01)

(58) Field of Classification Search
CPC ..... H04W 76/15; H04W 52/06; H04W 88/10; H04W 4/40
See application file for complete search history.

(56) References Cited

U.S. PATENT DOCUMENTS

2020/0396695 A1* 12/2020 Bhushan ............ H04W 52/241

FOREIGN PATENT DOCUMENTS

JP 2017-215930 A 12/2017
JP 2019-165281 A 9/2019

(Continued)

OTHER PUBLICATIONS

International Search Report and Written Opinion mailed on Apr. 5, 2022, received for PCT Application PCT/JP2022/003739, filed on Feb. 1, 2022, 9 pages including English Translation.

*Primary Examiner* — Jamal Javaid
(74) *Attorney, Agent, or Firm* — XSENSUS LLP

(57) ABSTRACT

The present technology relates to a communication device, a communication method, and a vehicle that allow an improvement in data transmission efficiency in the vehicle. The communication device includes a first communication unit configured to perform communication over a first network that interconnects a plurality of zones in a vehicle, and a second communication unit configured to perform wireless communication over a second network formed in a first zone that is one of the plurality of zones. The present technology is applicable to, for example, a communication system provided in a vehicle.

17 Claims, 27 Drawing Sheets

(56) References Cited

FOREIGN PATENT DOCUMENTS

| | | | | |
|---|---|---|---|---|
| WO | 2018/003306 | A1 | 1/2018 | |
| WO | WO-2018065049 | A1 * | 4/2018 | .............. H04W 4/40 |
| WO | 2020/152973 | A1 | 7/2020 | |

* cited by examiner

COMMUNICATION DEVICE, COMMUNICATION METHOD, AND VEHICLE

CROSS-REFERENCE TO RELATED APPLICATIONS

The present application is based on PCT filing PCT/JP2022/003739, filed Feb. 1, 2022, which claims priority from Japanese Patent Application No. 2021-079533, filed May 10, 2021, the entire contents of each are incorporated herein by reference.

TECHNICAL FIELD

The present technology relates to a communication device, a communication method, and a vehicle, and more particularly, to a communication device, a communication method, and a vehicle that allow an improvement in data transmission efficiency in the vehicle.

BACKGROUND ART

In recent years, the development of technology related to vehicle to vehicle communication by which wireless communication is performed with neighboring vehicles is making progress for the purpose of preventing accidents and the like (see, for example, Patent Document 1).

Furthermore, data transmission volume in vehicles is forecast to increase due to an increase in functionality of the vehicles such as automated driving and the like and providing various types of information and entertainment in the vehicles.

CITATION LIST

Patent Document

Patent Document 1: Japanese Patent Application Laid-Open No. 2017-215930

SUMMARY OF THE INVENTION

Problems to be Solved by the Invention

On the other hand, there is a demand for a technology for efficiently transmitting data so as to cope with an increase in data transmission volume in the vehicles.

The present technology has been made in view of such circumstances, and it is therefore an object of the present technology to improve data transmission efficiency in vehicles.

Solutions to Problems

A communication device of a first aspect of the present technology includes a first communication unit configured to perform communication over a first network that interconnects a plurality of zones in a vehicle, and a second communication unit configured to perform wireless communication over a second network formed in a first zone that is one of the plurality of zones.

A communication method of the first aspect of the present technology includes performing, by a communication device, communication over a first network that interconnects a plurality of zones in a vehicle, and performing, by the communication device, wireless communication over a second network formed in a first zone that is one of the plurality of zones.

In the first aspect of the present technology, communication is performed over the first network that interconnects the plurality of zones in a vehicle, and wireless communication is performed over the second network formed in the first zone that is one of the plurality of zones.

A communication device of a second aspect of the present technology includes a communication unit configured to communicate with an access point of a second network formed in a local zone that is one of a plurality of zones in a vehicle, the plurality of zones being interconnected by a first network, and communicate with an access point of a third network present near the local zone.

A communication method of the second aspect of the present technology includes performing, by a communication device, communication with an access point of a second network formed in a local zone that is one of a plurality of zones in a vehicle, the plurality of zones being interconnected by a first network, and performing, by the communication device, communication with an access point of a third network present near the local zone.

In the second aspect of the present technology, communication is performed with the access point of the second network formed in the local zone that is one of the plurality of zones in the vehicle, the plurality of zones being interconnected by the first network, and communication is performed with the access point of the third network present near the local zone.

A vehicle of a third aspect of the present technology includes a first network that interconnects a plurality of zones, and a plurality of second networks, each of which including a wireless network formed in each of the zones.

In the third aspect of the present technology, the plurality of zones is interconnected, and a wireless network is formed in each of the zones by the second network.

MODE FOR CARRYING OUT THE INVENTION

Hereinafter, a mode for carrying the present technology will be described. Note that the description will be given in the following order.

1. Configuration Example of Vehicle Control System
2. Configuration Example of Conventional In-Vehicle Communication System
3. Embodiment
4. Modification Example
5. Others

1. Configuration Example of Vehicle Control System

Figure 1:
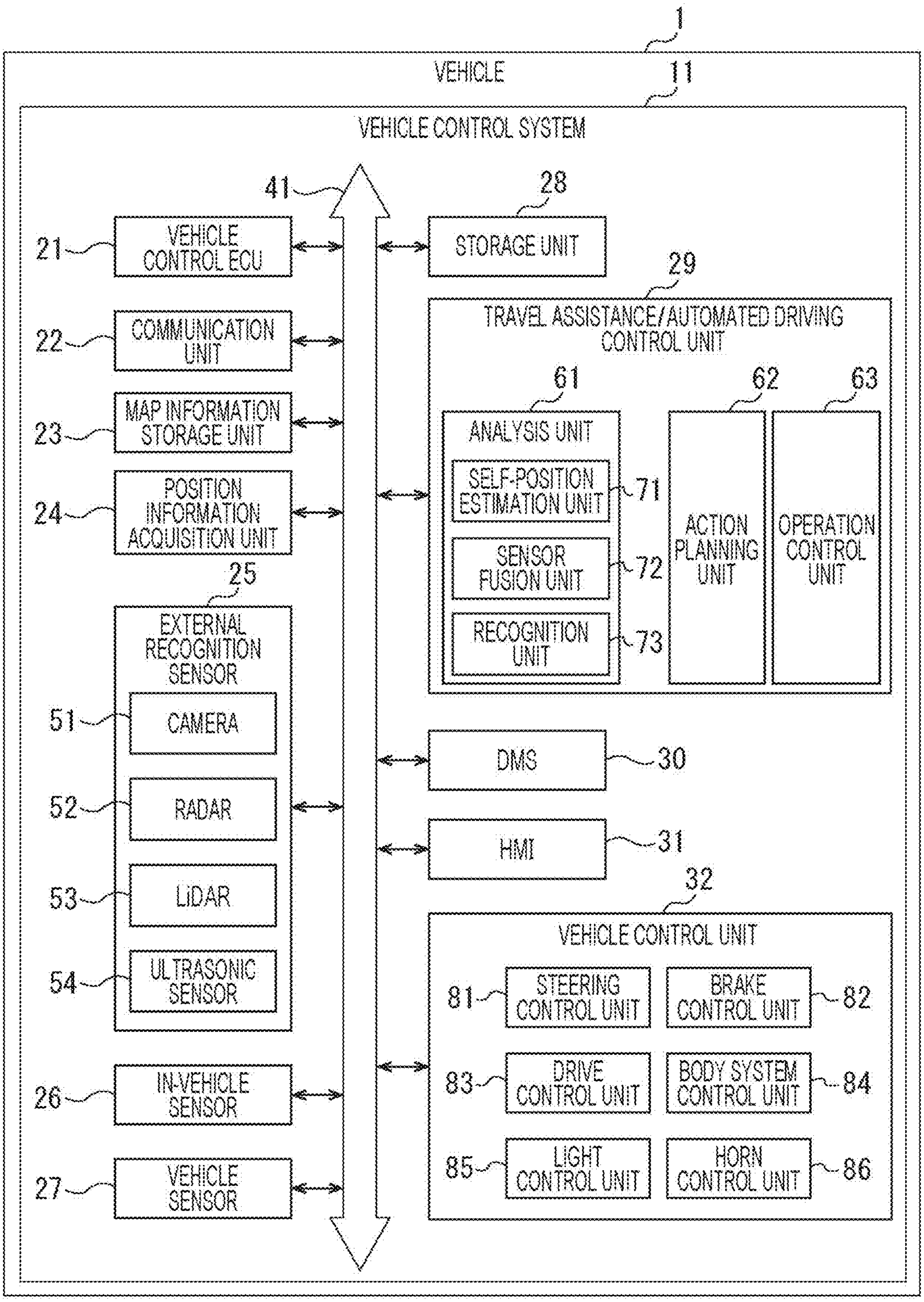
FIG. 1 is a block diagram depicting a configuration example of a vehicle control system.

FIG. 1 is a block diagram depicting a configuration example of a vehicle control system 11 that is an example of a mobile device control system to which the present technology is applied.

The vehicle control system 11 is provided in a vehicle 1 and performs processing related to travel assistance and automated driving of the vehicle 1.

The vehicle control system 11 includes a vehicle control electronic control unit (ECU) 21, a communication unit 22, a map information storage unit 23, a position information acquisition unit 24, an external recognition sensor 25, an in-vehicle sensor 26, a vehicle sensor 27, a storage unit 28, a travel assistance/automated driving control unit 29, a driver monitoring system (DMS) 30, a human machine interface (HMI) 31, and a vehicle control unit 32.

The vehicle control ECU 21, the communication unit 22, the map information storage unit 23, the position information acquisition unit 24, the external recognition sensor 25, the in-vehicle sensor 26, the vehicle sensor 27, the storage unit 28, the travel assistance/automated driving control unit 29, the driver monitoring system (DMS) 30, the human machine interface (HMI) 31, and the vehicle control unit 32 are communicatively connected to each other over a communication network 41. The communication network 41 includes, for example, an in-vehicle communication network, a bus, or the like that conforms to a digital bidirectional communication standard such as controller area network (CAN), local interconnect network (LIN), local area network (LAN), FlexRay (registered trademark), and Ethernet (registered trademark). The communication network 41 may be selectively used depending on the type of data to be transmitted. For example, CAN may be applied to data related to vehicle control, and Ethernet may be applied to large-volume data. Note that units of the vehicle control system 11 may be directly connected to each other using wireless communication adapted to a relatively short-range communication, such as near field communication (NFC) or Bluetooth (registered trademark) without using the communication network 41.

Note that, hereinafter, in a case where each unit of the vehicle control system 11 performs communication over the communication network 41, the description of the communication network 41 will be omitted. For example, in a case where the vehicle control ECU 21 and the communication unit 22 perform communication over the communication network 41, it will be simply described that the vehicle control ECU 21 and the communication unit 22 perform communication.

The vehicle control ECU 21 includes, for example, various processors such as a central processing unit (CPU) and a micro processing unit (MPU). The vehicle control ECU 21 controls all or some of the functions of the vehicle control system 11.

The communication unit 22 communicates with various devices inside and outside the vehicle, another vehicle, a server, a base station, and the like, and transmits and receives various data. At this time, the communication unit 22 can perform communication using a plurality of communication schemes.

Communication with the outside of the vehicle executable by the communication unit 22 will be schematically described. The communication unit 22 communicates with a server (hereinafter, the server is referred to as an external server) or the like present on an external network via a base station or an access point by, for example, a wireless communication scheme such as fifth generation mobile communication system (5G), long term evolution (LTE), dedicated short range communications (DSRC), or the like. Examples of the external network with which the communication unit 22 performs communication include the Internet, a cloud network, a company-specific network, and the like. The communication scheme by which the communication unit 22 communicates with the external network is not particularly limited as long as it is a wireless communication scheme allowing digital bidirectional communication at a communication speed equal to or higher than a predetermined speed and over a distance equal to or longer than a predetermined distance.

Furthermore, for example, the communication unit 22 can communicate with a terminal present in the vicinity of a host vehicle using a peer to peer (P2P) technology. The terminal present in the vicinity of the host vehicle is, for example, a terminal attached to a moving body moving at a relatively low speed such as a pedestrian or a bicycle, a terminal fixedly installed in a store or the like, or a machine type communication (MTC) terminal. Moreover, the communication unit 22 can also perform V2X communication. The V2X communication refers to, for example, communication between the host vehicle and another vehicle, such as vehicle to vehicle communication with another vehicle, vehicle to infrastructure communication with a roadside device or the like, vehicle to home communication, and vehicle to pedestrian communication with a terminal or the like carried by a pedestrian.

For example, the communication unit 22 can receive a program for updating software for controlling the operation of the vehicle control system 11 from the outside (Over The Air). The communication unit 22 can further receive map information, traffic information, information regarding the surroundings of the vehicle 1, and the like from the outside. Furthermore, for example, the communication unit 22 can transmit information regarding the vehicle 1, information regarding the surroundings of the vehicle 1, and the like to the outside. Examples of the information regarding the vehicle 1 transmitted to the outside by the communication unit 22 include data indicating the state of the vehicle 1, a recognition result from a recognition unit 73, and the like. Moreover, for example, the communication unit 22 performs communication corresponding to a vehicle emergency call system such as an eCall.

For example, the communication unit 22 receives an electromagnetic wave transmitted by a road traffic information communication system (vehicle information and communication system (VICS) (registered trademark)), such as a radio wave beacon, an optical beacon, or FM multiplex broadcasting.

Communication with the inside of the vehicle executable by the communication unit 22 will be schematically described. The communication unit 22 can communicate with each device in the vehicle using, for example, wireless communication. The communication unit 22 can perform wireless communication with a device in the vehicle by, for example, a communication scheme allowing digital bidirectional communication at a communication speed equal to or higher than a predetermined speed by wireless communication, such as wireless LAN, Bluetooth, NFC, or wireless USB (WUSB). It is not limited thereto, and the communication unit 22 can also communicate with each device in the vehicle using wired communication. For example, the communication unit 22 can communicate with each device in the vehicle by wired communication via a cable connected to a connection terminal (not depicted). The communication unit 22 can communicate with each device in the vehicle by a communication scheme allowing digital bidirectional communication at a communication speed equal to or higher than a predetermined speed by wired communication, such as universal serial bus (USB), high-definition multimedia interface (HDMI) (registered trademark), or mobile high-definition link (MHL).

Here, the device in the vehicle refers to, for example, a device that is not connected to the communication network 41 in the vehicle. As the device in the vehicle, for example, a mobile device or a wearable device carried by an occupant such as a driver or the like, an information device brought into the vehicle and temporarily installed, or the like is assumed.

The map information storage unit 23 stores either or both of a map acquired from the outside and a map created by the vehicle 1. For example, the map information storage unit 23 stores a three-dimensional high-precision map, a global map that is lower in precision than the high-precision map but covers a wider area, and the like.

The high-precision map is, for example, a dynamic map, a point cloud map, a vector map, or the like. The dynamic map is, for example, a map including four layers of dynamic information, semi-dynamic information, semi-static information, and static information, and is provided to the vehicle 1 from the external server or the like. The point cloud map is a map including a point cloud (point cloud data). The vector map is, for example, a map in which traffic information such as a lane and a position of a traffic light is associated with a point cloud map and adapted to an advanced driver assistance system (ADAS) or autonomous driving (AD).

The point cloud map and the vector map may be provided from, for example, the external server or the like, or may be created by the vehicle 1 as a map for performing matching with a local map to be described later on the basis of a sensing result from a camera 51, a radar 52, a LiDAR 53, or the like, and may be stored in the map information storage unit 23. Furthermore, in a case where the high-precision map is provided from the external server or the like, for example, map data of several hundred meters square regarding a planned route on which the vehicle 1 travels from now is acquired from the external server or the like in order to reduce the communication traffic.

The position information acquisition unit 24 receives a global navigation satellite system (GNSS) signal from a GNSS satellite, and acquires position information of the vehicle 1. The acquired position information is supplied to the travel assistance/automated driving control unit 29. Note that the position information acquisition unit 24 may acquire the position information using not only a method using the GNSS signal, but also, for example, a beacon.

The external recognition sensor 25 includes various sensors used for recognizing surroundings of the vehicle 1, and supplies sensor data from each sensor to each unit of the vehicle control system 11. The type and number of sensors included in the external recognition sensor 25 may be determined as desired.

For example, the external recognition sensor 25 includes the camera 51, the radar 52, the light detection and ranging or laser imaging detection and ranging (LiDAR) 53, and an ultrasonic sensor 54. It is not limited thereto, and the external recognition sensor 25 may include one or more types of sensors among the camera 51, the radar 52, the LiDAR 53, and the ultrasonic sensor 54. The number of sensors: the camera 51; the radar 52; the LiDAR 53; and the ultrasonic sensor 54, is not particularly limited as long as they can be practically installed in the vehicle 1. Furthermore, the external recognition sensor 25 may include, but not limited to sensors of the types described in this example, sensors of other types. An example of the sensing area of each sensor included in the external recognition sensor 25 will be described later.

Note that an imaging method of the camera 51 is not particularly limited. For example, as the camera 51, cameras of various imaging methods such as a time of flight (ToF) camera, a stereo camera, a monocular camera, and an infrared camera can be applied as necessary. It is not limited thereto, and the camera 51 may simply acquire a captured image regardless of distance measurement.

Furthermore, for example, the external recognition sensor 25 can include an environment sensor for detecting the environment for the vehicle 1. The environment sensor is a sensor for detecting an environment such as weather, climate, and brightness, and can include various sensors such as a raindrop sensor, a fog sensor, a sunshine sensor, a snow sensor, and an illuminance sensor, for example.

Moreover, for example, the external recognition sensor 25 includes a microphone used for detecting a sound around the vehicle 1, a position of a sound source, and the like.

The in-vehicle sensor 26 includes various sensors for detecting information regarding the inside of the vehicle, and supplies sensor data from each sensor to each unit of the vehicle control system 11. The types and number of various sensors included in the in-vehicle sensor 26 are not particularly limited as long as they can be practically installed in the vehicle 1.

For example, the in-vehicle sensor 26 can include one or more sensors of a camera, a radar, a seating sensor, a steering wheel sensor, a microphone, and a biological sensor. As the camera included in the in-vehicle sensor 26, for example, cameras of various imaging methods capable of measuring a distance, such as a ToF camera, a stereo camera, a monocular camera, and an infrared camera, can be used. It is not limited thereto, and the camera included in the in-vehicle sensor 26 may simply acquire a captured image regardless of distance measurement. The biological sensor included in the in-vehicle sensor 26 is provided in, for example, a seat, a steering wheel, or the like, and detects various types of biological information of the occupant such as the driver.

The vehicle sensor 27 includes various sensors for detecting the state of the vehicle 1, and supplies sensor data from each sensor to each unit of the vehicle control system 11. The types and number of various sensors included in the vehicle sensor 27 are not particularly limited as long as they can be practically installed in the vehicle 1.

For example, the vehicle sensor 27 includes a speed sensor, an acceleration sensor, an angular velocity sensor (gyro sensor), and an inertial measurement unit (IMU) as an integrated sensor including these sensors. For example, the vehicle sensor 27 includes a steering angle sensor that detects a steering angle of a steering wheel, a yaw rate sensor, an accelerator sensor that detects an operation amount of an accelerator pedal, and a brake sensor that detects an operation amount of a brake pedal. For example, the vehicle sensor 27 includes a rotation sensor that detects the number of rotations of an engine or a motor, an air pressure sensor that detects the air pressure of a tire, a slip rate sensor that detects the slip rate of the tire, and a wheel speed sensor that detects the rotation speed of a wheel. For example, the vehicle sensor 27 includes a battery sensor that detects the state of charge and temperature of a battery, and an impact sensor that detects an external impact.

The storage unit 28 includes at least one of a nonvolatile storage medium or a volatile storage medium, and stores data and a program. The storage unit 28 is used as, for example, an electrically erasable programmable read only memory (EEPROM) and a random access memory (RAM), and a magnetic storage device such as a hard disc drive (HDD), a semiconductor storage device, an optical storage device, and a magneto-optical storage device can be applied as a storage medium. The storage unit 28 stores various programs and data used by each unit of the vehicle control system 11. For example, the storage unit 28 includes an event data recorder (EDR) and a data storage system for automated driving (DSSAD), and stores information regarding the vehicle 1 before and after an event such as an accident and information acquired by the in-vehicle sensor 26.

The travel assistance/automated driving control unit 29 controls travel assistance and automated driving of the vehicle 1. For example, the travel assistance/automated driving control unit 29 includes an analysis unit 61, an action planning unit 62, and an operation control unit 63.

The analysis unit 61 performs analysis processing on the vehicle 1 and the surroundings of the vehicle 1. The analysis unit 61 includes a self-position estimation unit 71, a sensor fusion unit 72, and the recognition unit 73.

The self-position estimation unit 71 estimates a self-position of the vehicle 1 on the basis of sensor data from the external recognition sensor 25 and the high-precision map stored in the map information storage unit 23. For example, the self-position estimation unit 71 creates a local map on the basis of the sensor data from the external recognition sensor 25, and estimates the self-position of the vehicle 1 by matching the local map with the high-precision map. The position of the vehicle 1 is based on, for example, a center of a rear wheel pair axle.

The local map is, for example, a three-dimensional high-precision map created using a technology such as simultaneous localization and mapping (SLAM), or the like, an occupancy grid map, or the like. The three-dimensional high-precision map is, for example, the above-described point cloud map or the like. The occupancy grid map is a map in which a three-dimensional or two-dimensional space around the vehicle 1 is divided into grids (lattices) of a predetermined size, and an occupancy state of an object is represented in units of grids. The occupancy state of the object is represented by, for example, the presence or absence or existence probability of the object. The local map is also used for detection processing and recognition processing on the surroundings of the vehicle 1 by the recognition unit 73, for example.

Note that the self-position estimation unit 71 may estimate the self-position of the vehicle 1 on the basis of the position information acquired by position information acquisition unit 24 and sensor data from the vehicle sensor 27.

The sensor fusion unit 72 performs sensor fusion processing to obtain new information by combining a plurality of different types of sensor data (for example, image data supplied from the camera 51 and sensor data supplied from the radar 52). The method for combining different types of sensor data include integration, fusion, association, and the like.

The recognition unit 73 performs detection processing for detecting the surroundings of the vehicle 1 and recognition processing for recognizing the surroundings of the vehicle 1.

For example, the recognition unit 73 performs the detection processing and the recognition processing on the surroundings of the vehicle 1 on the basis of information from the external recognition sensor 25, information from the self-position estimation unit 71, information from the sensor fusion unit 72, and the like.

Specifically, for example, the recognition unit 73 performs detection processing, recognition processing, and the like on an object around the vehicle 1. The object detection processing is, for example, processing of detecting presence or absence, size, shape, position, movement, and the like of an object. The object recognition processing is, for example, processing of recognizing an attribute such as a type of an object or the like or identifying a specific object. The detection processing and the recognition processing, however, are not always clearly separated and may overlap.

For example, the recognition unit 73 detects an object around the vehicle 1 by performing clustering to classify point clouds based on sensor data from the LiDAR 53, the radar 52, or the like into clusters of point clouds. Thus, the presence or absence, size, shape, and position of the object around the vehicle 1 are detected.

For example, the recognition unit 73 detects a motion of the object around the vehicle 1 by performing tracking that follows a motion of the cluster of point clouds classified by clustering. Thus, the speed and the traveling direction (movement vector) of the object around the vehicle 1 are detected.

For example, the recognition unit 73 detects or recognizes a vehicle, a person, a bicycle, an obstacle, a structure, a road, a traffic light, a traffic sign, a road sign, and the like on the basis of the image data supplied from the camera 51. Furthermore, the recognition unit 73 may recognize the type of the object around the vehicle 1 by performing recognition processing such as semantic segmentation.

For example, the recognition unit 73 can perform recognition processing on traffic rules around the vehicle 1 on the basis of a map stored in the map information storage unit 23, a result of estimation of the self-position by the self-position estimation unit 71, and a result of recognition of an object around the vehicle 1 by the recognition unit 73. Through this processing, the recognition unit 73 can recognize the position and the state of the traffic light, the details of the traffic sign and the road sign, the details of the traffic regulation, the travelable lane, and the like.

For example, the recognition unit 73 can perform recognition processing on a surrounding environment of the vehicle 1. As the surrounding environment to be recognized by the recognition unit 73, weather, temperature, humidity, brightness, road surface conditions, and the like are assumed.

The action planning unit 62 creates an action plan for the vehicle 1. For example, the action planning unit 62 creates an action plan by performing processing of route planning and route following.

Note that the route planning (global path planning) is processing of planning a rough route from a start to a goal. This route planning is called a trajectory plan, and includes processing of creating a trajectory (local path planning) that enables safe and smooth traveling in the vicinity of the vehicle 1 in consideration of the motion characteristics of the vehicle 1 in the planned route.

The route following is processing of planning an operation for safely and accurately traveling a route planned by the route planning within a planned time. For example, the action planning unit 62 can calculate the target speed and the target angular velocity of the vehicle 1 on the basis of a result of the route following processing.

The operation control unit 63 controls the operation of the vehicle 1 in order to achieve the action plan created by the action planning unit 62.

For example, the operation control unit 63 controls a steering control unit 81, a brake control unit 82, and a drive control unit 83 included in the vehicle control unit 32 to be described later, and performs acceleration and deceleration control and direction control so that the vehicle 1 travels on the trajectory calculated by the trajectory planning. For example, the operation control unit 63 performs coordinated control for the purpose of implementing the functions of the ADAS such as collision avoidance or impact mitigation, follow-up traveling, vehicle speed maintaining traveling, collision warning of the host vehicle, lane deviation warning of the host vehicle, and the like. For example, the operation control unit 63 performs coordinated control for the purpose of automated driving or the like in which the vehicle autonomously travels without depending on the operation of the driver.

The DMS 30 performs authentication processing on the driver, recognition processing on a state of the driver, and the like on the basis of sensor data from the in-vehicle sensor 26, input data input to the HMI 31 to be described later, and the like. As the state of the driver to be recognized, for example, a physical condition, an alertness level, a concentration level, a fatigue level, a line-of-sight direction, a drunkenness level, a driving operation, a posture, and the like are assumed.

Note that the DMS 30 may perform authentication processing on an occupant other than the driver and recognition processing on a state of the occupant. Furthermore, for example, the DMS 30 may perform recognition processing on the conditions inside the vehicle on the basis of sensor data from the in-vehicle sensor 26. As the conditions inside the vehicle to be recognized, for example, temperature, humidity, brightness, odor, and the like are assumed.

The HMI 31 receives inputs of various data, instructions, and the like, and presents various data to the driver or the like.

The input of data through the HMI 31 will be schematically described. The HMI 31 includes an input device for a person to input data. The HMI 31 generates an input signal on the basis of data, an instruction, or the like input with the input device, and supplies the input signal to each unit of the vehicle control system 11. The HMI 31 includes, for example, an operation element such as a touch panel, a button, a switch, and a lever as the input device. It is not limited thereto, and the HMI 31 may further include an input device capable of inputting information by a method such as voice, gesture, or the like other than manual operation. Moreover, the HMI 31 may use, for example, a remote control device using infrared rays or radio waves, or an external connection device such as a mobile device or a wearable device adapted to the operation of the vehicle control system 11 as an input device.

Presentation of data by the HMI 31 will be schematically described. The HMI 31 generates visual information, auditory information, and tactile information for the occupant or the outside of the vehicle. Furthermore, the HMI 31 performs output control for controlling the output, output content, output timing, output method, and the like of each piece of generated information. The HMI 31 generates and outputs, as the visual information, an operation screen, a state display of the vehicle 1, a warning display, an image such as a monitor image indicating the surroundings of the vehicle 1, and information indicated by light, for example. Furthermore, the HMI 31 generates and outputs, as the auditory information, information indicated by sounds such as voice guidance, a warning sound, and a warning message, for example. Moreover, the HMI 31 generates and outputs, as the tactile information, information given to the tactile sense of the occupant by force, vibration, motion, or the like, for example.

As an output device that the HMI 31 outputs the visual information, for example, a display device that presents the visual information by displaying an image by itself or a projector device that presents the visual information by projecting an image can be applied. Note that the display device may be a device that displays the visual information in the field of view of the occupant, such as a head-up display, a transmissive display, or a wearable device having an augmented reality (AR) function, for example, in addition to a display device having a normal display. Furthermore, in the HMI 31, a display device included in a navigation device, an instrument panel, a camera monitoring system (CMS), an electronic mirror, a lamp, or the like provided in the vehicle 1 can also be used as the output device that outputs the visual information.

As an output device from which the HMI 31 outputs the auditory information, for example, an audio speaker, a headphone, or an earphone can be applied.

As an output device to which the HMI 31 outputs the tactile information, for example, a haptic element using a haptic technology can be applied. The haptics element is provided, for example, at a portion with which the occupant of the vehicle 1 comes into contact, such as a steering wheel or a seat.

The vehicle control unit 32 controls each unit of the vehicle 1. The vehicle control unit 32 includes the steering control unit 81, the brake control unit 82, the drive control unit 83, a body system control unit 84, a light control unit 85, and a horn control unit 86.

The steering control unit 81 performs detection, control, and the like of a state of a steering system of the vehicle 1. The steering system includes, for example, a steering mechanism including a steering wheel and the like, an electric power steering, and the like. The steering control unit 81 includes, for example, a steering ECU that controls the steering system, an actuator that drives the steering system, and the like.

The brake control unit 82 performs detection, control, and the like of a state of a brake system of the vehicle 1. The brake system includes, for example, a brake mechanism including a brake pedal, an antilock brake system (ABS), a regenerative brake mechanism, and the like. The brake control unit 82 includes, for example, a brake ECU that controls the brake system, an actuator that drives the brake system, and the like.

The drive control unit 83 performs detection, control, and the like of a state of a drive system of the vehicle 1. The drive system includes, for example, an accelerator pedal, a driving force generation device for generating a driving force such as an internal combustion engine or a driving motor, a driving force transmission mechanism for transmitting the driving force to wheels, and the like. The drive control unit 83 includes, for example, a drive ECU that controls the drive system, an actuator that drives the drive system, and the like.

The body system control unit 84 performs detection, control, and the like of a state of a body system of the vehicle 1. The body system includes, for example, a keyless entry system, a smart key system, a power window device, a power seat, an air conditioner, an airbag, a seat belt, a shift lever, and the like. The body system control unit 84 includes, for example, a body system ECU that controls the body system, an actuator that drives the body system, and the like.

The light control unit 85 performs detection, control, and the like of states of various lights of the vehicle 1. As the lights to be controlled, for example, a headlight, a backlight, a fog light, a turn signal, a brake light, a projection, a bumper display, and the like are assumed. The light control unit 85 includes a light ECU that controls the lights, an actuator that drives the lights, and the like.

The horn control unit 86 performs detection, control, and the like of a state of a car horn of the vehicle 1. The horn control unit 86 includes, for example, a horn ECU that controls the car horn, an actuator that drives the car horn, and the like.

Figure 2:
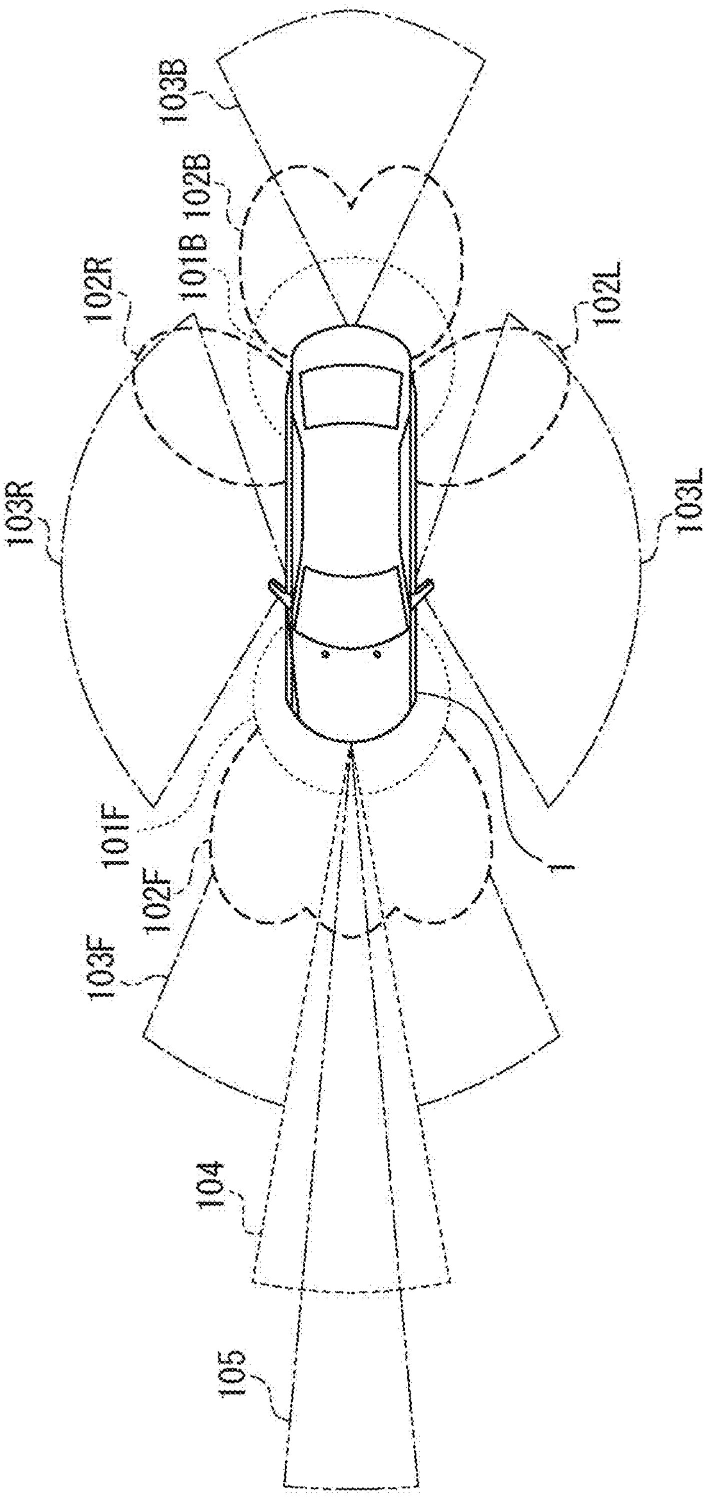
FIG. 2 is a diagram depicting an example of a sensing area.

FIG. 2 is a diagram depicting examples of sensing areas of the camera 51, the radar 52, the LiDAR 53, the ultrasonic sensor 54, and the like of the external recognition sensor 25 in FIG. 1. Note that FIG. 2 schematically depicts the vehicle 1 as viewed from above, where a left end side is the front end (front) side of the vehicle 1 and a right end side is the rear end (rear) side of the vehicle 1.

Sensing areas 101F and 101B illustrate examples of sensing areas of the ultrasonic sensor 54. The sensing area 101F covers an area around the front end of the vehicle 1 by a plurality of the ultrasonic sensors 54. The sensing area 101B covers an area around the rear end of the vehicle 1 by a plurality of the ultrasonic sensors 54.

Sensing results in the sensing area 101F and the sensing area 101B are used for, for example, parking assistance and the like of the vehicle 1.

Sensing areas 102F to 102B illustrate examples of sensing areas of a short-range or medium-range radar 52. The sensing area 102F covers an area extending farther than the sensing area 101F in front of the vehicle 1. The sensing area 102B covers an area extending farther than the sensing area 101B behind the vehicle 1. A sensing area 102L covers an area around the rear-left side of the vehicle 1. A sensing area 102R covers an area around the rear-right side of the vehicle 1.

A sensing result in the sensing area 102F is used for, for example, detection of a vehicle, a pedestrian, or the like present in front of the vehicle 1, and the like. A sensing result in the sensing area 102B is used for, for example, a function of preventing a collision of the rear of the vehicle 1, and the like. Sensing results in the sensing areas 102L and 102R are used for, for example, detection of an object in a blind spot on the sides of the vehicle 1, and the like.

Sensing areas 103F to 103B illustrate examples of sensing areas of the camera 51. The sensing area 103F covers an area extending farther than the sensing area 102F in front of the vehicle 1. The sensing area 103B covers an area extending farther than the sensing area 102B behind the vehicle 1. A sensing area 103L covers an area around the left side of the vehicle 1. A sensing area 103R covers an area around the right side of the vehicle 1.

A sensing result in the sensing area 103F can be used for, for example, recognition of a traffic light or a traffic sign, a lane departure prevention assist system, and an automatic headlight control system. A sensing result in the sensing area 103B is used for, for example, parking assistance, a surround view system, and the like. Sensing results in the sensing areas 103L and 103R can be used for, for example, a surround view system.

A sensing area 104 illustrates an example of a sensing area of the LiDAR 53. The sensing area 104 covers an area extending farther than the sensing area 103F in front of the vehicle 1. Whereas, the sensing area 104 has a narrower range in a left-right direction than the sensing area 103F.

A sensing result in the sensing area 104 is used for, for example, detection of an object such as a neighboring vehicle.

A sensing area 105 illustrates an example of a sensing area of a long-range radar 52. The sensing area 105 covers an area extending farther than the sensing area 104 in front of the vehicle 1. Whereas, the sensing area 105 has a narrower range in the left-right direction than the sensing area 104.

A sensing result in the sensing area 105 is used for, for example, adaptive cruise control (ACC), emergency braking, collision avoidance, and the like.

Note that the respective sensing areas of the sensors: the camera 51; the radar 52; the LiDAR 53; and the ultrasonic sensor 54, included in the external recognition sensor 25 may have various configurations other than those in FIG. 2. Specifically, the ultrasonic sensor 54 may also perform sensing on the sides of the vehicle 1, or the LiDAR 53 may perform sensing on the rear of the vehicle 1. Furthermore, the installation position of each sensor is not limited to each example described above. Furthermore, the number of sensors may be one or more.

The present technology is intended to improve data transmission efficiency in an in-vehicle communication system provided in the vehicle 1 or the like.

2. Configuration Example of Conventional In-Vehicle Communication System

Figure 3:
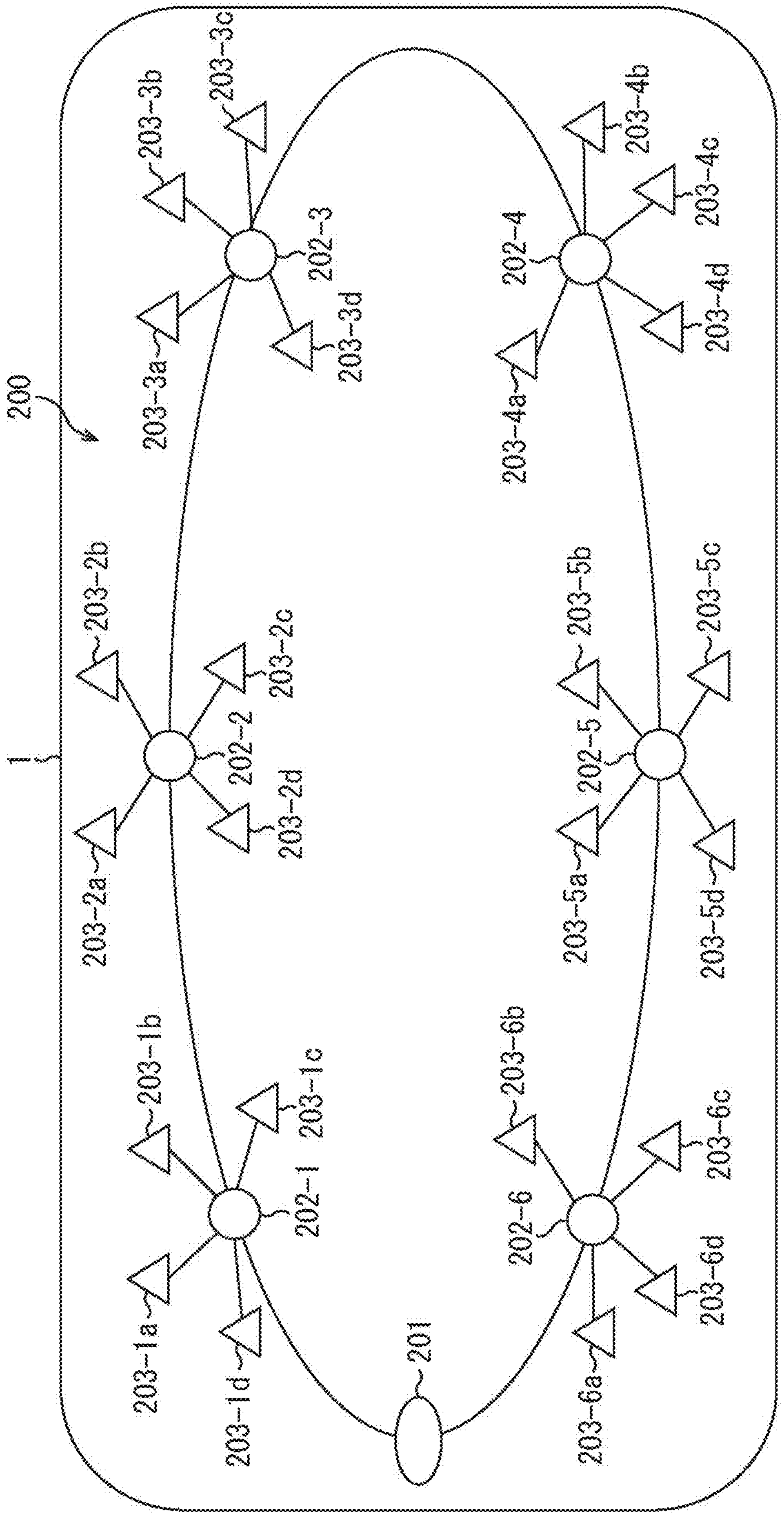
FIG. 3 is a diagram depicting a configuration example of a conventional in-vehicle communication system.

FIG. 3 depicts a configuration example of a conventional in-vehicle communication system 200.

The communication system 200 includes a central control node 201, zone control nodes 202-1 to 202-6, and device nodes 203-1*a* to 203-6*d*.

Note that, hereinafter, in a case where it is not necessary to individually distinguish the zone control nodes 202-1 to 202-6, they are simply referred to as a zone control node 202. Hereinafter, in a case where it is not necessary to individually distinguish the device nodes 203-1*a* to 203-6*d*, they are simply referred to as a device node 203. Hereinafter, the device node 203 may be simply referred to as a device 203.

The device node 203 includes various devices that transmit and receive various data such as sensor data and control data to and from another device node 203.

In the communication system 200, the device nodes 203 are arranged in six zones. In each zone, the zone control node 202 responsible for zone management and data transmission between zones is arranged.

The central control node 201 and the zone control nodes 202-1 to 202-1 are connected over a wired network such as Ethernet (registered trademark). The central control node 201 manages the entire communication system 200.

The device nodes 203-1*a* to 203-1*d* are connected to the zone control node 202-1 by wire. The device nodes 203-2*a* to 203-2*d* are connected to the zone control node 202-2 by wire. The device nodes 203-3*a* to 203-3*d* are connected to the zone control node 202-3 by wire. The device nodes 203-4*a* to 203-4*d* are connected to the zone control node 202-4 by wire. The device nodes 203-5*a* to 203-5*d* are connected to the zone control node 202-5 by wire. The device nodes 203-6*a* to 203-6*d* are connected to the zone control node 202-6 by wire.

Figure 4:
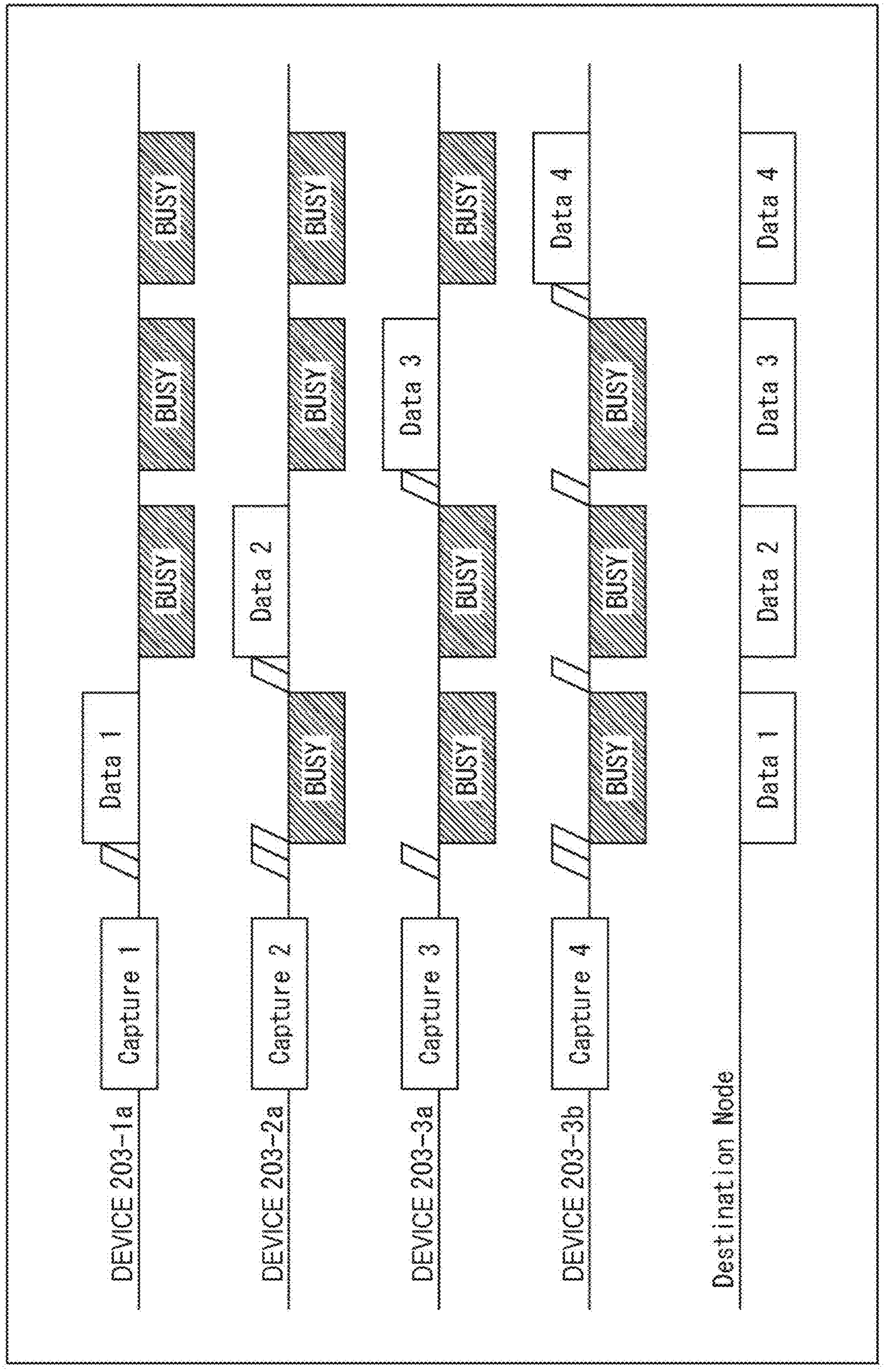
FIG. 4 is a diagram depicting an example of a data transmission flow in the conventional in-vehicle communication system.

FIG. 4 depicts an example of a data transmission flow in the communication system 200.

An example where the device node 203-1*a*, the device node 203-2*a*, the device node 203-3*a*, and the device node 203-3*b* simultaneously transmit data to the same device node 203 (Destination Node) is depicted.

Here, to the wired network based on Ethernet, for example, carrier sense multiple access/collision detection (CSMA/CD) is applied, which inhibits simultaneous transmission of data from the plurality of device nodes 203. Therefore, as depicted in FIG. 4, each device node 303 needs to wait until data transmission by another device node 203 is completed, and a transmission delay occurs accordingly. Therefore, for data that requires real-time transmission (data that needs to be processed in real time), the transmission delay may become a problem.

Furthermore, for Ethernet, a technology for increasing the data volume that can be transmitted over a transmission path has been developed, but emphasis is mainly placed on a maximum transmission speed, and an access control technology has not been sufficiently studied.

3. Embodiment

Next, embodiments of the present technology will be described with reference to FIGS. 5 to 26.

Configuration Example of Communication System 300

Figure 5:
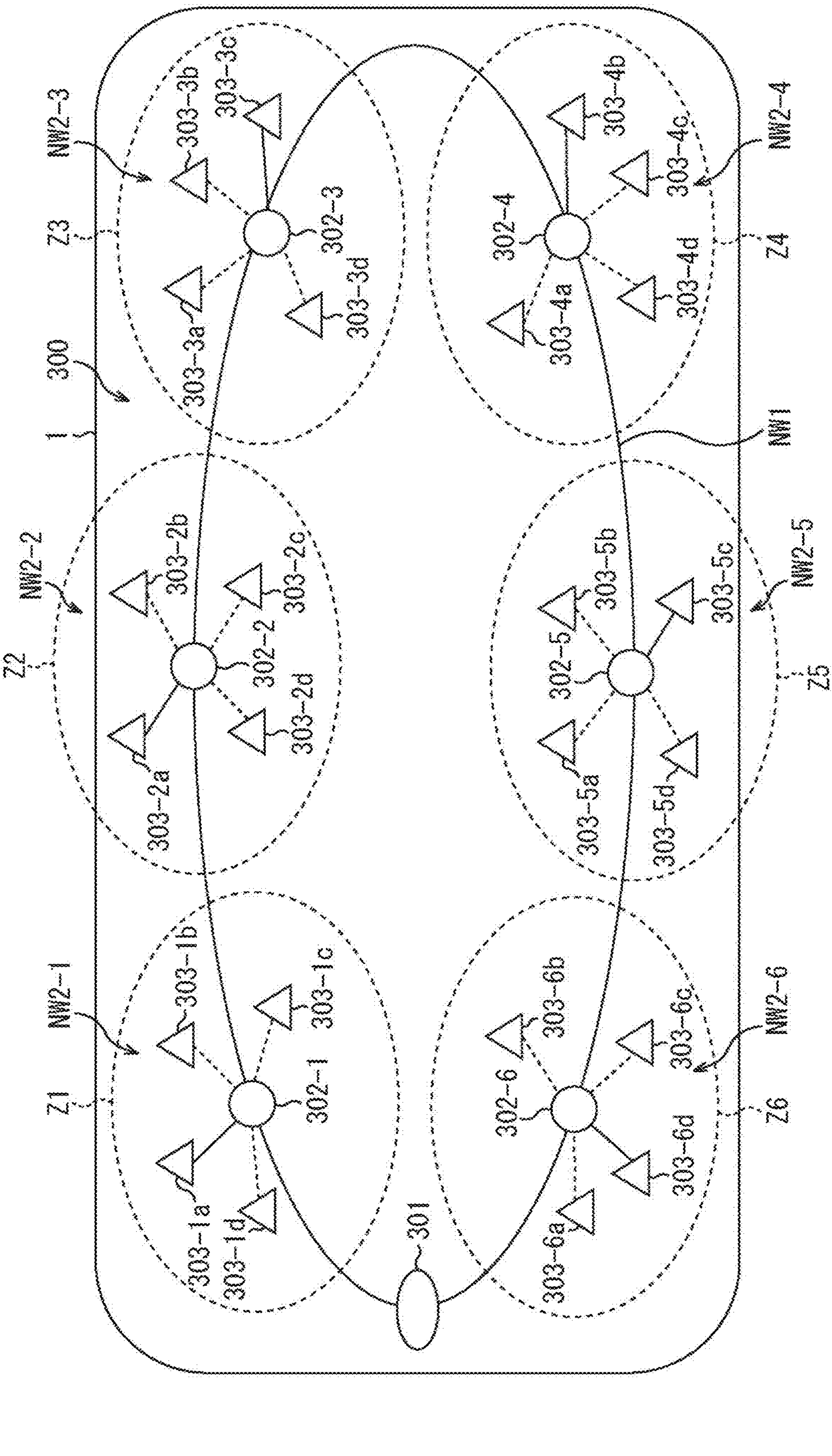
FIG. 5 is a diagram depicting a configuration example of an in-vehicle communication system to which the present technology is applied.

FIG. 5 depicts a configuration example of a communication system 300 to which the present technology is applied.

The communication system 300 constitutes an in-vehicle network for implementing at least a part of the vehicle control system 11 of the vehicle 1 described above.

Furthermore, the communication system 300 constitutes a network to which a zone-type architecture is applied. For example, a space in the vehicle 1 is divided into zones Z1 to Z6, communication control is performed for each zone, and inter-zone communication is performed.

The communication system 300 includes a central control node 301, zone control nodes 302-1 to 302-6, and device nodes 303-1*a* to 303-6*d*. Furthermore, the communication system 300 constitutes the in-vehicle network with two types of networks: a first network NW1 and second networks NW2-1 to NW2-6.

Note that, hereinafter, in a case where it is not necessary to individually distinguish the zone control nodes 302-1 to 302-6, they are simply referred to as a zone control node 302. Hereinafter, in a case where it is not necessary to individually distinguish the device nodes 303-1*a* to 303-6*d*, they are simply referred to as a device node 303. Hereinafter, the device node 303 may be simply referred to as a device 303. Hereinafter, in a case where it is not necessary to individually distinguish the second networks NW2-1 to NW2-6, they are simply referred to as a second network NW2.

The first network NW1 and the second network NW2 are configured by different transmission media. For example, the first network NW1 includes a wired network such as Ethernet. On the other hand, each second network NW2 includes a wireless network such as a wireless LAN.

Note that a wired network other than Ethernet may be applied to the first network NW1. Alternatively, for example, a wireless network may be applied to the first network NW1. Moreover, it is also possible to use the same type of transmission medium for the first network NW1 and the second network NW2 and apply communication schemes that do not affect each other.

The first network NW1 is a network that interconnects the zones Z1 to Z6 using a wired network such as Ethernet. The first network NW1 includes the central control node 301 and the zone control nodes 302-1 to 302-6. The central control node 301 and the zone control nodes 302-1 to 302-6 are connected in a ring shape by a wired network.

The second network NW2-1 is formed in the zone Z1. The second network NW2-1 includes the zone control node 302-1 and the device nodes 303-1*a* to 303-1*d* arranged in the zone Z1. The zone control node 302-1 and the device node 303-1*a* are connected by wire because they require high-reliable and real-time data transmission, for example. The zone control node 302-1 is wirelessly connected to the device nodes 303-1*b* to 303-1*d*.

The second network NW2-2 is formed in the zone Z2. The second network NW2-2 includes the zone control node 302-2 and the device nodes 303-2*a* to 303-2*d* arranged in the zone Z2. The zone control node 302-2 and the device node 303-2*a* are connected by wire because they require high-reliable and real-time data transmission, for example. The zone control node 302-2 is wirelessly connected to the device nodes 303-2*b* to 303-2*d*.

The second network NW2-3 is formed in the zone Z3. The second network NW2-3 includes the zone control node 302-3 and the device nodes 303-3*a* to 303-3*d* arranged in the zone Z3. The zone control node 302-3 and the device node 303-3*c* are connected by wire because they require high-reliable and real-time data transmission, for example. The zone control node 302-3 is wirelessly connected to the device node 303-3*a*, the device node 303-3*b*, and the device node 303-3*d*.

The second network NW2-4 is formed in the zone Z4. The second network NW2-4 includes the zone control node 302-4 and the device nodes 303-4*a* to 303-4*d* arranged in the zone Z4. The zone control node 302-4 and the device node 303-4*b* are connected by wire because they require high-reliable and real-time data transmission, for example. The zone control node 302-4 is wirelessly connected to the device node 303-4*a*, the device node 303-4*c*, and the device node 303-4*d*.

The second network NW2-5 is formed in the zone Z5. The second network NW2-5 includes the zone control node 302-5 and the device nodes 303-5*a* to 303-5*d* arranged in the zone Z5. The zone control node 302-5 and the device node 303-5*c* are connected by wire because they require high-reliable and real-time data transmission, for example. The zone control node 302-5 is wirelessly connected to the device node 303-5*a*, the device node 303-5*b*, and the device node 303-5*d*.

The second network NW2-6 is formed in the zone Z6. The second network NW2-6 includes the zone control node 302-6 and the device nodes 303-6*a* to 303-6*d* arranged in the zone Z6. The zone control node 302-6 and the device node 303-6*d* are connected by wire because they require high-reliable and real-time data transmission, for example. The zone control node 302-6 is wirelessly connected to the device nodes 303-6*a* to 303-6*c*.

The central control node 301 includes, for example, a network controller, and centrally manages the communication system 300.

Each zone control node 302 centrally controls communication in a zone to which the zone control node 302 belongs (hereinafter, referred to as a local zone), and also acts as an access point (hereinafter, referred to as an AP). The zone control node 302 transfers data received from the device node 303 in the local zone to another zone control node 302 in the first network NW1 or to another device node 303 in the local zone. The zone control node 302 further transfers data received from another zone control node 302 in the first network NW1 to yet another zone control node 302 in the first network NW1 or to the device node 303 in the local zone.

Note that, for example, it is also assumed that the zone control node 302 centrally control communication in the local zone but does not act as an AP. In the following description, it is, however, assumed that each zone control node 302 acts as an AP, and the zone control node 302 is also referred to as an AP.

The device node 303 includes a device that has a communication function and performs at least one of data transmission to another device node 303 or data reception from another device node 303.

Note that data transmitted and received between the device nodes 303 is not particularly limited. For example, image data, sensor data, control data, or the like is transmitted and received.

Figure 6:
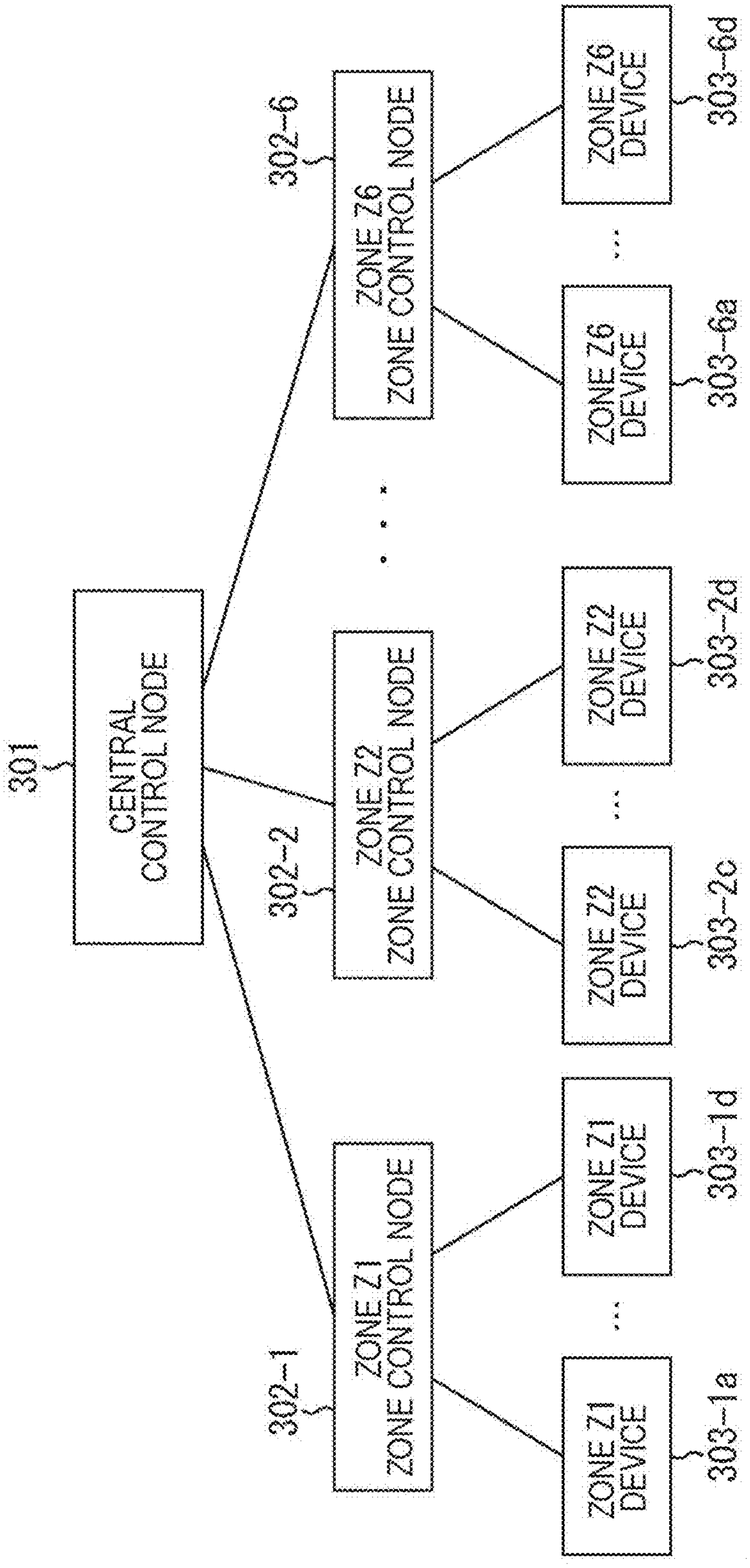
FIG. 6 is a diagram depicting an example of a hierarchical structure of the in-vehicle communication system to which the present technology is applied.

FIG. 6 depicts an example of a hierarchical structure of the communication system 300.

In the communication system 300, the central control node 301 manages, in an integrated manner, the zones constituting the communication system 300. Specifically, the central control node 301 is connected to the zone control node 302 arranged in each zone over a wired network to constitute the first network NW1, and manages each zone control node 302 in an integrated manner.

Each zone control node 302 manages each device node 303 present in each zone. For example, the zone control node 302-1 is connected to each device node 303 present in the zone Z1 in a wired or wireless manner to constitute the second network NW2-1, and manages each connected device node 303.

Note that a configuration may be employed where, without providing the central control node 301, each zone control node 302 operates autonomously and decentrally.

Furthermore, the number of zones in the communication system 300 is not limited to a specific number, and any number of zones may be provided. The number of device nodes 303 in each second network NW2 is also not limited to a specific number, and any number of device nodes 303 may be provided. Furthermore, the number of device nodes 303 in each second network NW2 may be different from each other. Moreover, the number of zone control nodes 302 in each second network NW2 is not limited to a specific number, and any number of zone control nodes 302 may be provided.

First Configuration Example of Communication Device

Figure 7:
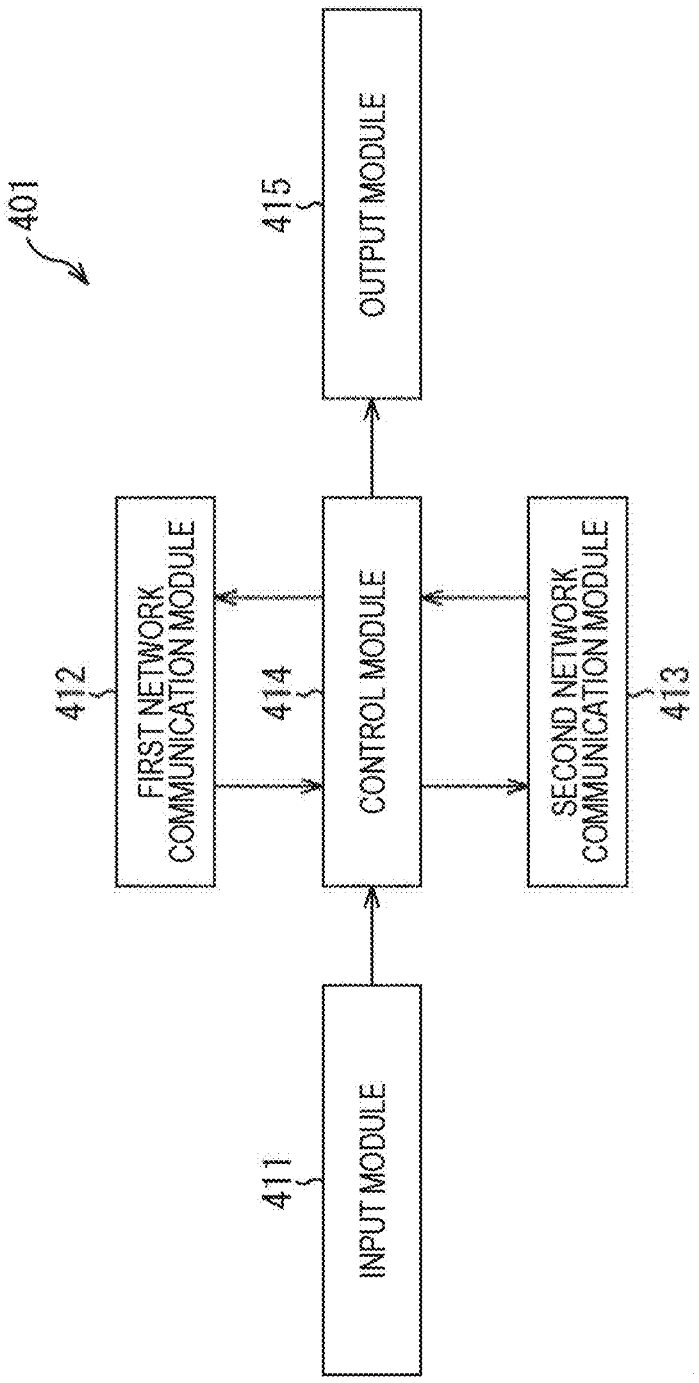
FIG. 7 is a block diagram depicting a configuration example of a communication device to which the present technology is applied.

FIG. 7 depicts a configuration example of a communication device 401 constituting the central control node 301, the zone control node 302, or the device node 303.

The communication device 401 includes an input module 411, a first network communication module 412, a second network communication module 413, a control module 414, and an output module 415.

The input module 411 includes, for example, various input devices, and is used for inputting data to be transmitted to another device, data to be processed by the communication device 401, and the like. Furthermore, the input module 411 is used for inputting an instruction or the like to the communication device 401. The input module 411 supplies the input data, instruction, or the like to the control module 414.

The first network communication module 412 is a module that is connected to the first network NW1 and performs communication over the first network NW1. For example, the first network communication module 412 acquires data to be transmitted to the first network NW1 from the control module 414, and transmits the data to the first network NW1. The first network communication module 412 supplies data received from the first network NW1 to the control module 414.

The second network communication module 413 is a module that is connected to the second network NW2 and performs communication over the second network NW2. The second network communication module 413 acquires data to be transmitted to the second network NW2 from the control module 414, and transmits the data to the second network NW2. The second network communication module 413 supplies data received from the second network NW2 to the control module 414.

The control module 414 includes a CPU, a memory, and the like, and controls processing of each unit of the communication device 401. Furthermore, the control module 414 supplies data supplied from the input module 411, the first network communication module 412, or the second network communication module 413 to the first network communication module 412, the second network communication module 413, or the output module 415 as necessary.

The output module 415 includes, for example, various output devices, and outputs data supplied from the control module 414 or outputs information (for example, an image, a sound, or the like) based on the supplied data.

Note that it is possible to eliminate some of the modules to be mounted on the communication device 401, depending on the functions to be implemented.

For example, in a case where the communication device 401 is a device that transmits, as a sensor, collected data to the zone control node 302, the communication device 401 includes the input module 411, the second network communication module 413, and the control module 414.

For example, in a case where the communication device 401 is a device that displays information based on data collected in each zone on the communication system 300 or collects data for making a determination, the communication device 401 includes the first network communication module 412, the control module 414, and the output module 415.

For example, in a case where the communication device 401 operates as an AP that is the zone control node 302, the communication device 401 includes the first network communication module 412, the second network communication module 413, and the control module 414.

Second Configuration Example of Communication Device

Figure 8:
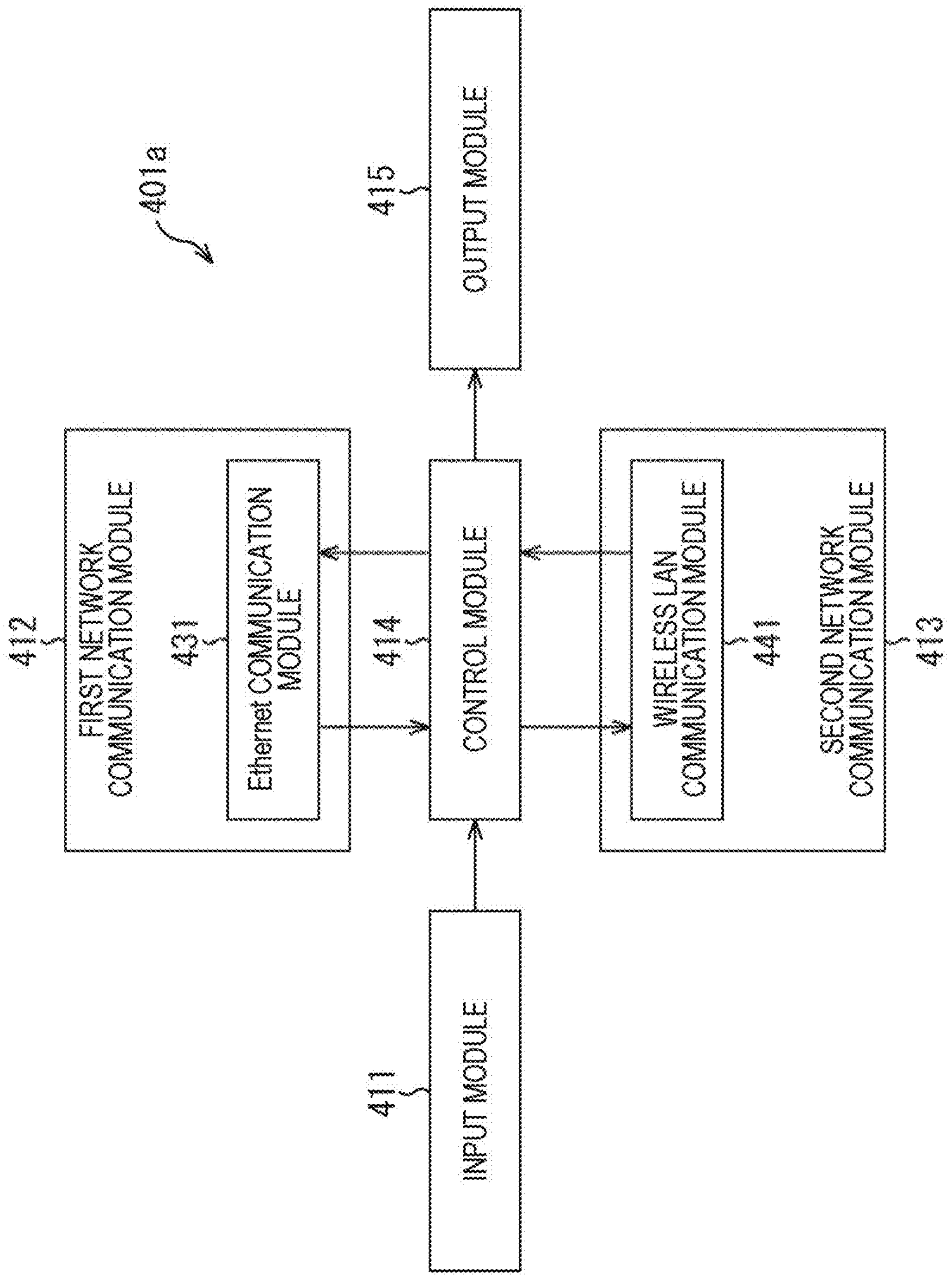
FIG. 8 is a block diagram depicting a first configuration example in a case where the communication device to which the present technology is applied is used as an access point.

FIG. 8 depicts a specific example of the communication device 401 in FIG. 7 that is a configuration example of a communication device 401*a* used as the zone control node 302 (AP). Note that, in the drawing, components corresponding to the components of the communication device 401 in FIG. 7 are denoted by the same reference numerals, and the description thereof will be omitted as appropriate.

In the communication device 401*a*, the first network communication module 412 includes an Ethernet communication module 431, and the first network communication module 412 includes a wireless LAN communication module 441.

The input module 411 includes, for example, an input device used for operation setting of the communication device 401 or the like.

In a case where Ethernet is applied to the first network NW1, the Ethernet communication module 431 is a module that is connected to the first network NW1 and performs communication over the first network NW1.

In a case where wireless LAN is applied to the second network NW2, the wireless LAN communication module 441 is a module that is connected to the second network NW2 and performs communication over the second network NW2.

The output module 415 includes, for example, a display device for displaying various operations or the like.

Third Configuration Example of Communication Device

Figure 9:
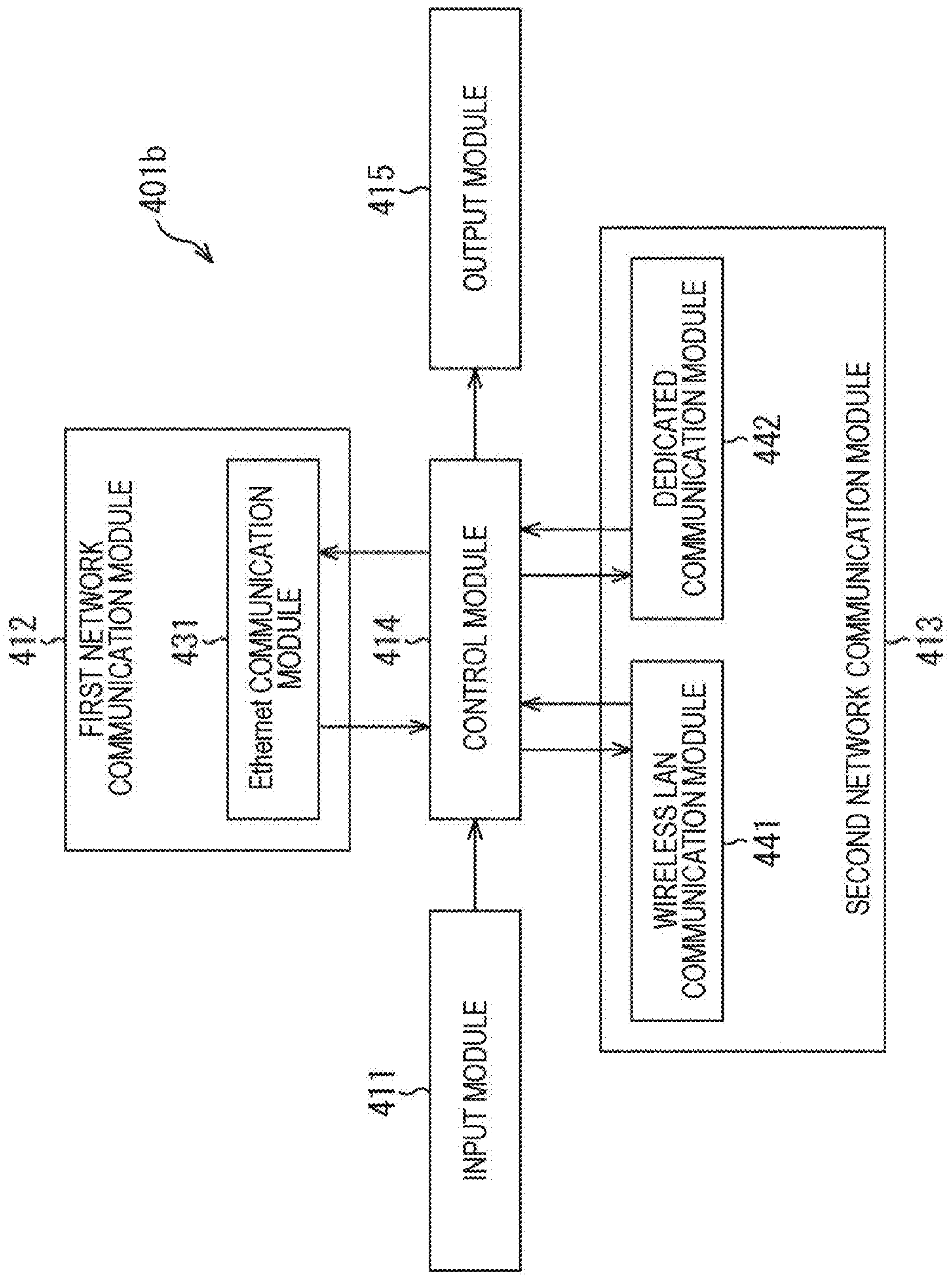
FIG. 9 is a block diagram depicting a second configuration example in a case where the communication device to which the present technology is applied is used as an access point.

FIG. 9 depicts a specific example of the communication device 401 in FIG. 7 that is a configuration example of a communication device 401*b* used as the zone control node 302 (AP). Note that, in the drawing, components corresponding to the components of the communication device 401*a* in FIG. 8 are denoted by the same reference numerals, and the description thereof will be omitted as appropriate.

The communication device 401*b* is different from the communication device 401*a* in that the second network communication module 413 includes the wireless LAN communication module 441 and a dedicated communication module 442.

The dedicated communication module 442 is a module that is connected to the device node 303 in the second network NW2 by wire using a dedicated communication line and performs communication. The dedicated communication module 442 is used for, for example, high-reliable and real-time data transmission.

Note that, hereinafter, in a case where it is not necessary to individually distinguish the communication devices 401, 401*a*, and 401*b*, they are simply referred to as a communication device 401.

Configuration Example of Communication Control Unit

Figure 10:
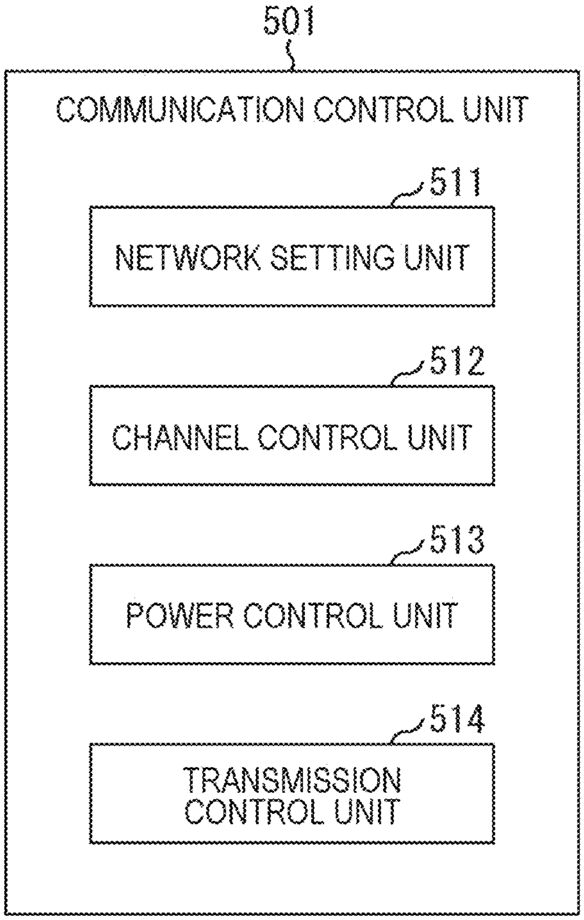
FIG. 10 is a block diagram depicting a configuration example of a communication control unit.

FIG. 10 depicts a configuration example of a communication control unit 501 implemented by a predetermined program executed by the control module 414 of the communication device 401.

The communication control unit 501 includes a network setting unit 511, a channel control unit 512, a power control unit 513, and a transmission control unit 514.

As will be described later, the network setting unit 511 makes settings on the network to which the communication device 401 belongs on the basis of information from the input module 411, the first network communication module 412, and the second network communication module 413. For example, the network setting unit 511 sets the role of the communication device 401. For example, in a case where the communication device 401 operates as an AP, the network setting unit 511 collects information regarding the device node 303 in the local zone and exchanges information regarding zones with the AP (zone control node 302) in the neighboring zone.

As will be described later, the channel control unit 512 sets a frequency channel used for wireless communication by the second network communication module 413 (wireless LAN communication module 441), in other words, a frequency channel of the second network NW2, on the basis of information from the input module 411, the first network communication module 412, and the second network communication module 413. For example, the channel control unit 512 sets the frequency channel on the basis of at least one of communication conditions of the second network NW2 in the local zone, the frequency channel of the second network NW2 in the neighboring zone, or the surroundings of the vehicle 1. The communication conditions of the second network NW2 in the local zone include at least one of a data transmission volume, an allowable data delay time, or required data reliability, for example.

Figure 11:
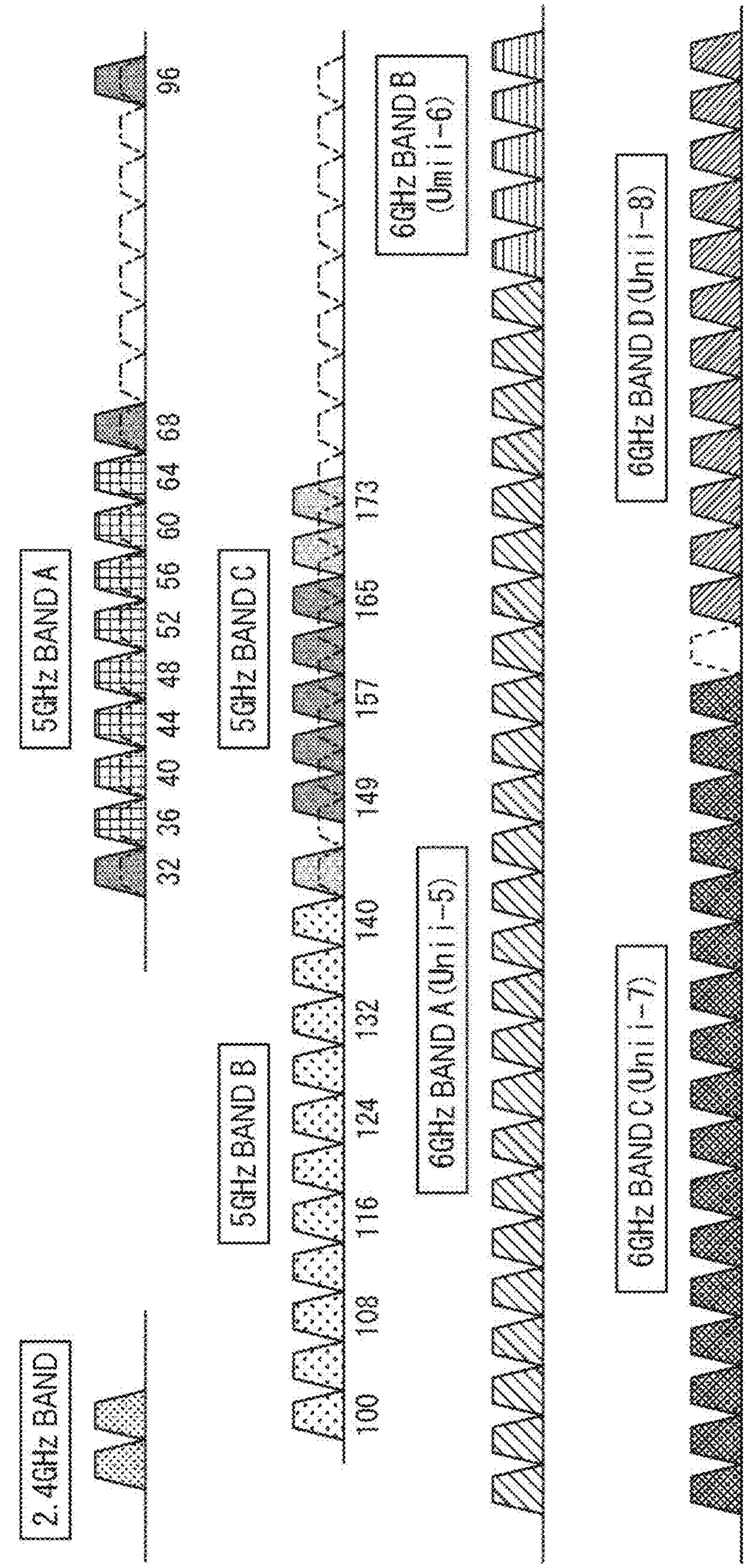
FIG. 11 is a diagram depicting an example of a frequency band allocated to each zone.

FIG. 11 depicts examples of frequency bands that can be used by the second network NW2 and channel allocation.

In the 2.4 GHz band, a frequency band corresponding to at least two channels to be applied to a wireless signal of the OFDM scheme with a 20 MHz bandwidth according to IEEE 802.11g standard is available.

In the 5 GHz band, a plurality of channels to be applied to a wireless signal of the OFDM scheme with a 20 MHz bandwidth according to IEEE 802.11a standard or the like is available. However, operations in such frequency bands are accompanied with conditions for determining an available frequency range, transmit power, and transmission possibility in the legal system of each country.

Furthermore, channel numbers are given below the diagram of the 5 GHz band, showing that 8 channels from a channel 36 to a channel 64, and 11 channels from a channel 100 to a channel 140 are available in Japan.

Note that, in other countries and regions, a channel 32, a channel 68, a channel 96, and a channel 144 are also available. Moreover, in a frequency band higher than the above, a channel 149 to a channel 173 are available.

In the 6 GHz band whose standardization is currently underway, 25 channels in the UNII-5 band of the 6 GHz band A, 5 channels in the UNII-6 band of the 6 GHZ band B, 17 channels in the UNII-7 band of the 6 GHz band C, and 12 channels in the UNII-8 band of the 6 GHz band D are available.

Returning to FIG. 10, the power control unit 513 controls the transmit power of the second network communication module 413 (wireless LAN communication module 441) on the basis of information from the input module 411, the first network communication module 412, and the second network communication module 413 as described later. For example, the power control unit 513 controls the transmit power in accordance with a communication status of the second network NW2 in the neighboring zone.

Figure 12:
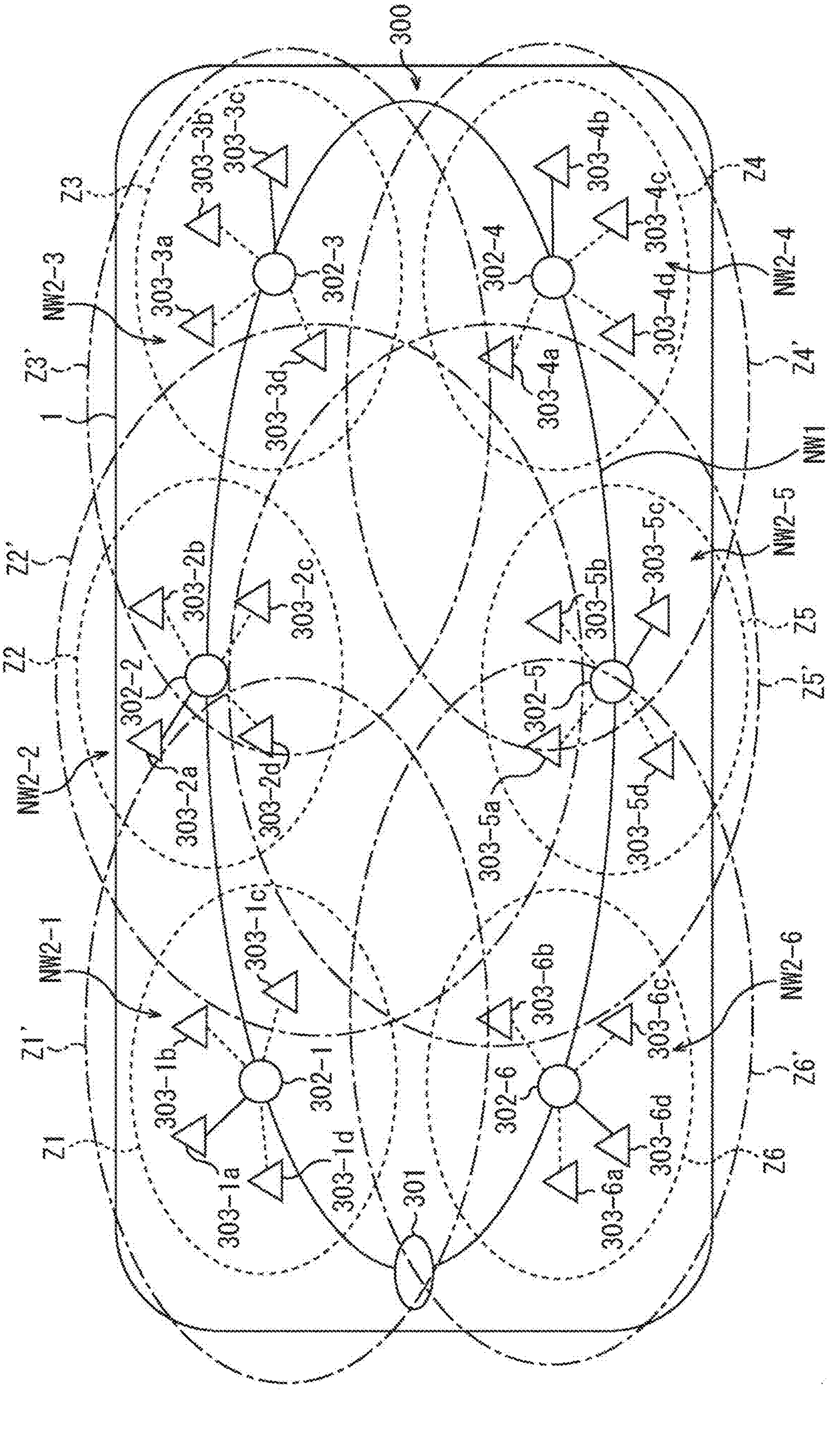
FIG. 12 is a diagram depicting an example of a communication range of each zone control node.

Communication ranges Z1' to Z6' in FIG. 12 each indicate a range in which a radio wave from a corresponding zone control node 302 reaches, and a physical connection is possible in a case where the transmit power of the second network communication module 413 (wireless LAN communication module 441) of the zone control node 302 is set to the maximum.

As described above, each zone control node 302 can make the communication range large as compared with a normal zone while allowing a logical connection with the device node 303 in each zone. That is, each zone control node 302 can make the range of the local zone larger.

Figure 13:
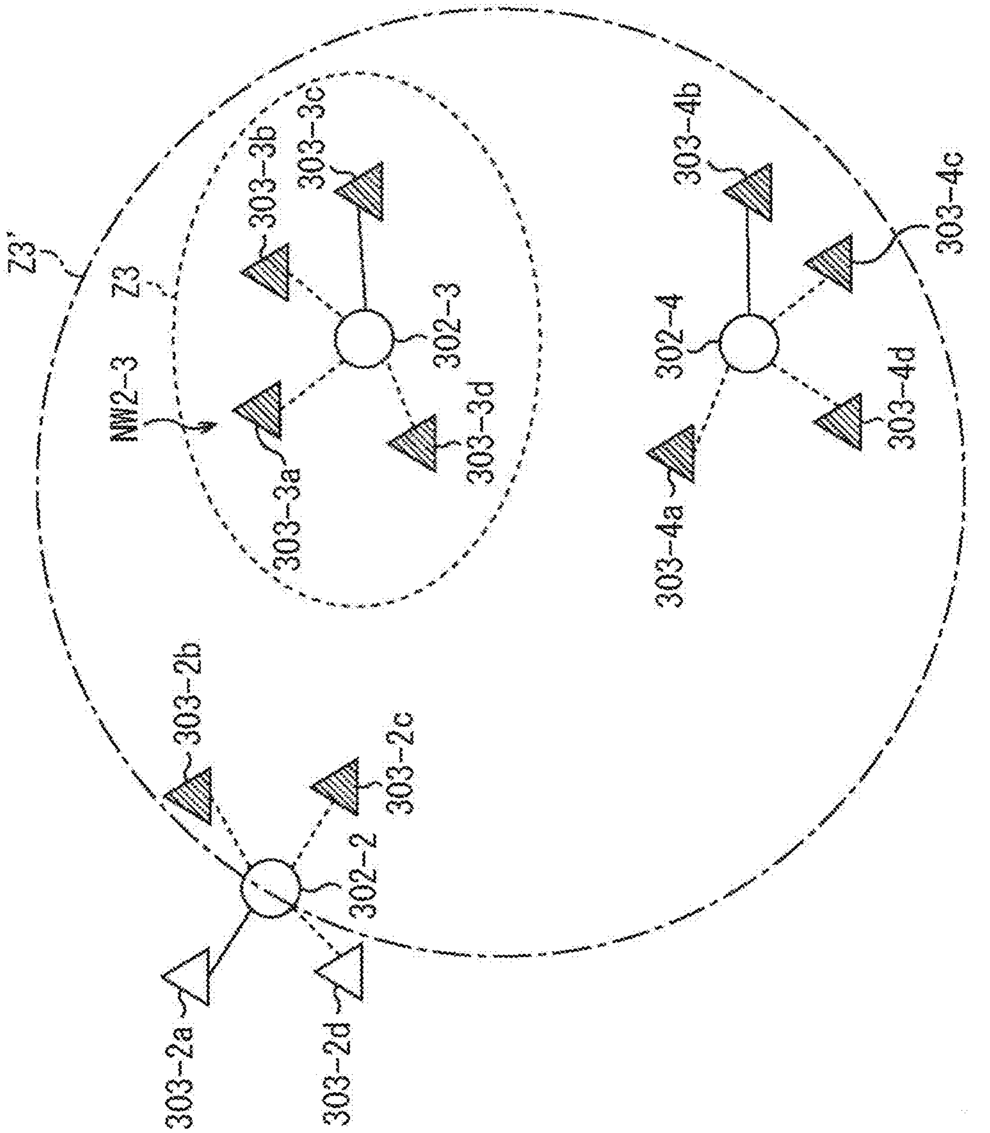
FIG. 13 is a diagram depicting an example of a communication range of a zone control node.

FIG. 13 depicts an example of the communication range Z3' in a case where the zone control node 302-3 sets the transmit power to the maximum. As described above, the zone control node 302-3 can recognize and communicate with, by setting the transmit power to the maximum, the device node 303 present in the neighboring zone in addition to the device node 303 in the original zone Z3. Specifically, the zone control node 302 can recognize and communicate with the device node 303-2*b*, the device node 303-2*c*, and the device nodes 303-4*a* to 303-4*d*.

Returning to FIG. 10, the transmission control unit 514 controls data transmission by the first network communication module 412 and the second network communication module 413.

<Network Setting Processing>

Next, network setting processing to be performed by the communication device 401 will be described with reference to the flowcharts in FIGS. 14 and 15.

This processing is performed, for example, at the time of initial setting, that is, at the time of factory shipment of the vehicle 1.

In step S101, the network setting unit 511 grasps a connection status of the in-vehicle network on the basis of information from the first network communication module 412 and the second network communication module 413.

In step S102, the network setting unit 511 determines whether or not there is a connection established with the first network NW1. In a case where it is determined that there is no connection established with the first network NW1, the processing proceeds to step S103.

In step S103, the network setting unit 511 determines whether or not there is a connection established with the second network NW2. In a case where it is determined that there is no connection established with the second network NW2, the processing returns to step S102.

Thereafter, the processes in steps S102 and S103 are repeatedly performed until it is determined in step S102 that there is a connection established with the first network NW1 or it is determined in step S103 that there is a connection established with the second network.

On the other hand, in a case where it is determined in step S102 that there is a connection established with the first network NW1, the processing proceeds to step S104.

In step S104, the network setting unit 511 determines whether or not a connection to the second network NW2 is possible. In a case where it is determined that a connection to the second network NW2 is possible, the processing proceeds to step S105.

In step S105, the communication device 401 starts to operate as the zone control node 302. Specifically, the network setting unit 511 sets the role of the communication device 401 so as to cause the communication device 401 to act as the zone control node 302, and instructs each unit of the communication device 401 to perform processing of the zone control node 302. Each unit of the communication device 401 starts the processing of the zone control node 302.

In step S106, the network setting unit 511 determines whether or not a connection is possible as an AP. In a case where it is determined that a connection is possible as an AP, the processing proceeds to step S107.

In step S107, the communication device 401 starts to operate as the AP of the second network NW2. Specifically, the network setting unit 511 sets the role of the communication device 401 so as to cause the communication device 401 to act as the AP of the second network NW2, and instructs each unit of the communication device 401 to perform processing of the AP of the second network NW2. Each unit of the communication device 401 starts the processing of the AP of the second network NW2.

In step S108, the network setting unit 511 determines whether or not there is a device detected in the local zone on the basis of information from the second network communication module 413. In a case where it is determined that there is a device detected in the local zone, the processing proceeds to step S109.

In step S109, the network setting unit 511 determines whether or not the detected device has been authenticated. In a case where it is determined that the detected device has not been authenticated, the processing proceeds to step S110.

In step S110, the network setting unit 511 performs device authentication processing. Specifically, the network setting unit 511 performs the authentication processing on the detected device via the second network communication module 413.

In step S111, the network setting unit 511 registers the authenticated device as an authenticated device in the local zone. Specifically, the network setting unit 511 registers, in local zone information, the newly authenticated device as the device node 303 in the local zone.

Thereafter, the processing proceeds to step S117.

On the other hand, in a case where it is determined in step S109 that the detected device has been authenticated, the processes in steps S110 and S111 are skipped, and the processing proceeds to step S117.

Furthermore, in a case where it is determined in step S108 that there is no device detected in the local zone, the processing proceeds to step S112.

In step S112, the network setting unit 511 determines whether or not a neighboring AP has been detected on the basis of information from the second network communication module 413. In a case where it is determined that a neighboring AP has been detected, the processing proceeds to step S113.

In step S113, the network setting unit 511 determines whether or not the detected AP is in the same in-vehicle network. In a case where it is determined that the AP is in the same in-vehicle network, the processing proceeds to step S114.

In step S114, the network setting units 511 exchanges zone information with each other. Specifically, the network setting unit 511 communicates with the detected AP via the second network communication module 413 to exchange information regarding their respective zones. For example, the network setting unit 511 transmits local zone information, which is information regarding the local zone, to the detected AP, and receives, from the detected AP, neighboring zone information, which is information regarding a zone to which the detected AP belongs.

Figure 16:
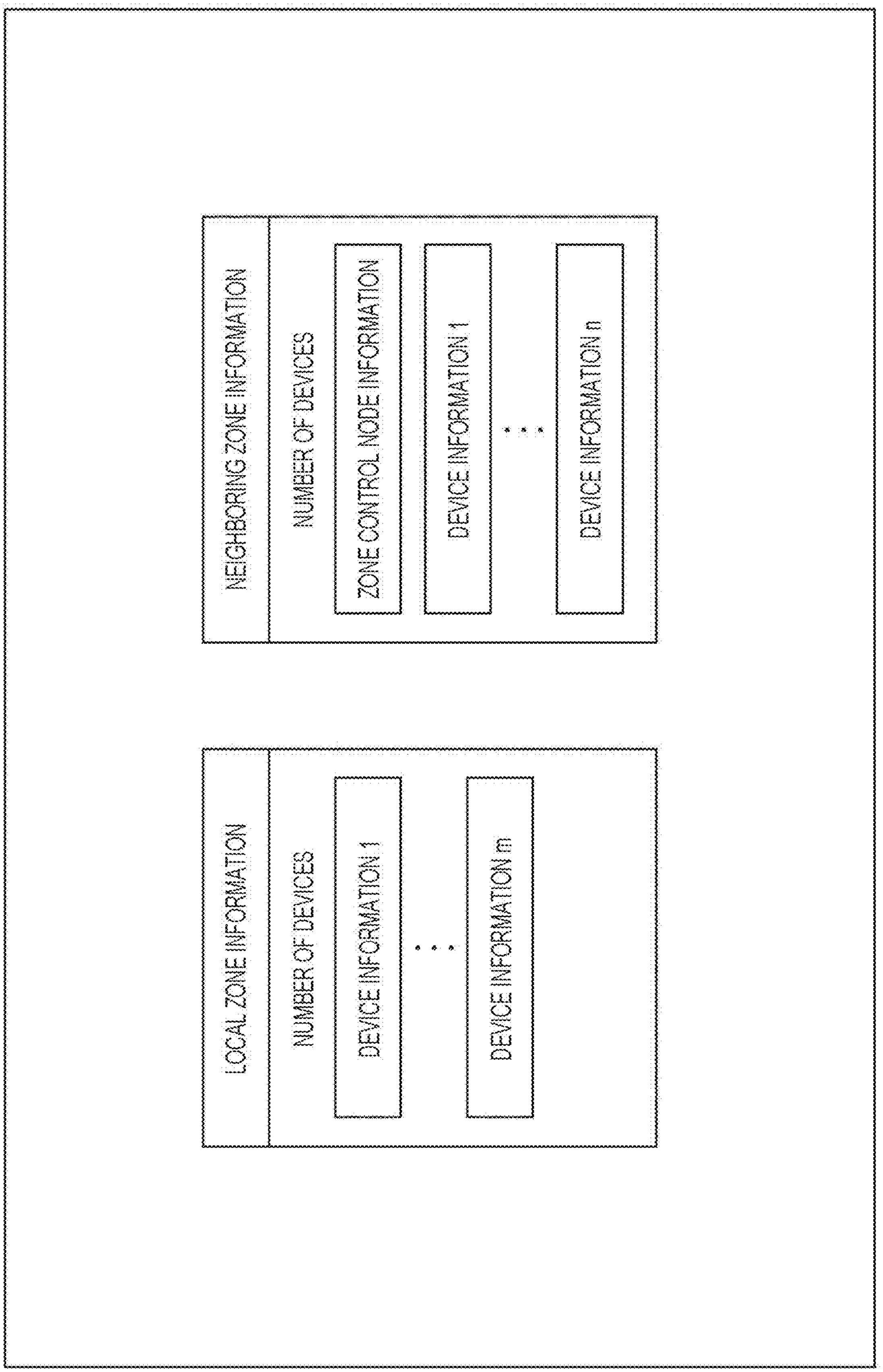
FIG. 16 is a diagram depicting a configuration example of local zone information and neighboring zone information.

FIG. 16 depicts an example of the local zone information and the neighboring zone information.

The local zone information includes the number of devices and device information 1 to device information m. The number of devices indicates the number of authenticated device nodes 303 in the local zone. The device information 1 to the device information m are information regarding each authenticated device node 303 in the local zone.

The neighboring zone information includes the number of devices, zone control node information, and device information 1 to device information n. The number of devices indicates the number of authenticated device nodes in the neighboring zone. The zone control node information is information regarding the zone control node 302 in the neighboring zone. The device information 1 to the device information n are information regarding each authenticated device node 303 in the neighboring zone.

Returning to FIG. 15, in step S115, the network setting unit 511 determines whether or not multi-AP coordinated operation is possible on the basis of the neighboring zone information acquired from the detected AP. In a case where it is determined that the multi-AP coordinated operation is possible, the processing proceeds to step S116.

In step S116, the network setting unit 511 makes settings of the multi-AP coordinated operation. Specifically, the network setting unit 511 makes settings of the second network communication module 413 and the like so as to be able to communicate with the detected AP via the second network communication module 413 to transmit and receive data to and from the detected AP in a multi-AP coordinated manner.

Thereafter, the processing proceeds to step S117.

On the other hand, in a case where it is determined in step S115 that the multi-AP coordinated operation is not possible, the process in step S116 is skipped, and the processing proceeds to step S117.

Furthermore, in a case where it is determined in step S113 that the detected AP is not in the same in-vehicle network, for example, in a case where the detected AP is in an in-vehicle network of another neighboring vehicle, the processes in steps S114 to S116 are skipped, and the processing proceeds to step S117.

Moreover, in a case where it is determined in step S112 that no neighboring AP has been detected, the processes in steps S113 to S116 are skipped, and the processing proceeds to step S117.

In step S117, the network setting unit 511 determines whether or not a setting period has ended. In a case where it is determined that the setting period has not ended, the processing returns to step S108.

Thereafter, until it is determined in step S117 that the setting period has ended, the processes in steps S108 to S117 are repeatedly performed. Accordingly, in the local zone, the second network NW2 using the communication device 401 as an AP is constructed, and the local zone information and the neighboring zone information are collected.

On the other hand, in a case where it is determined in step S117 that the setting period has ended, the network setting processing is brought to an end.

Furthermore, in a case where it is determined in step S106 that a connection is not possible as an AP, the network setting processing is brought to an end. In this case, the communication device 401 operates only as the zone control node 302 and does not operate as an AP.

Moreover, in a case where it is determined in step S104 that a connection to the second network NW2 is not possible, the processing proceeds to step S118.

In step S118, the communication device 401 starts to operate as the central control node 301. Specifically, the network setting unit 511 sets the role of the communication device 401 so as to cause the communication device 401 to act as the central control node 301, and instructs each unit of the communication device 401 to perform processing of the central control node 301. Each unit of the communication device 401 starts the processing of the central control node 301.

Thereafter, the network setting processing is brought to an end.

On the other hand, in a case where it is determined in step S103 that there is a connection established with the second network NW2, the processing proceeds to step S119.

In step S119, the network setting unit 511 requests, via the second network communication module 413, the zone control node 302 to perform authentication.

In step S120, the network setting unit 511 determines whether or not authentication registration is completed. In a case where it is determined that the authentication registration is not completed, the processing returns to step S119.

Thereafter, the processes in steps S119 and S120 are repeatedly performed until it is determined in step S120 that the authentication registration is completed.

On the other hand, in a case where it is determined in step S120 that the authentication registration is completed, the processing proceeds to step S121.

In step S121, the communication device 401 starts to operate as the device node 303. Specifically, the network setting unit 511 sets the role of the communication device 401 so as to cause the communication device 401 to act as the device node 303, and instructs each unit of the communication device 401 to perform processing of the device node 303. Each unit of the communication device 401 starts the processing of the device node 303.

Thereafter, the network setting processing is brought to an end.

As described above, the role of the communication device 401 is automatically set on the basis of the status of the connection with the in-vehicle network. Furthermore, in a case where the communication device 401 operates as an AP, the communication device 401 collects information regarding the device node 303 in the local zone, constructs the second network NW2, and exchanges, with an AP in the neighboring zone, information regarding their respective zones.

<Frequency Channel Setting Processing>

Figure 17:
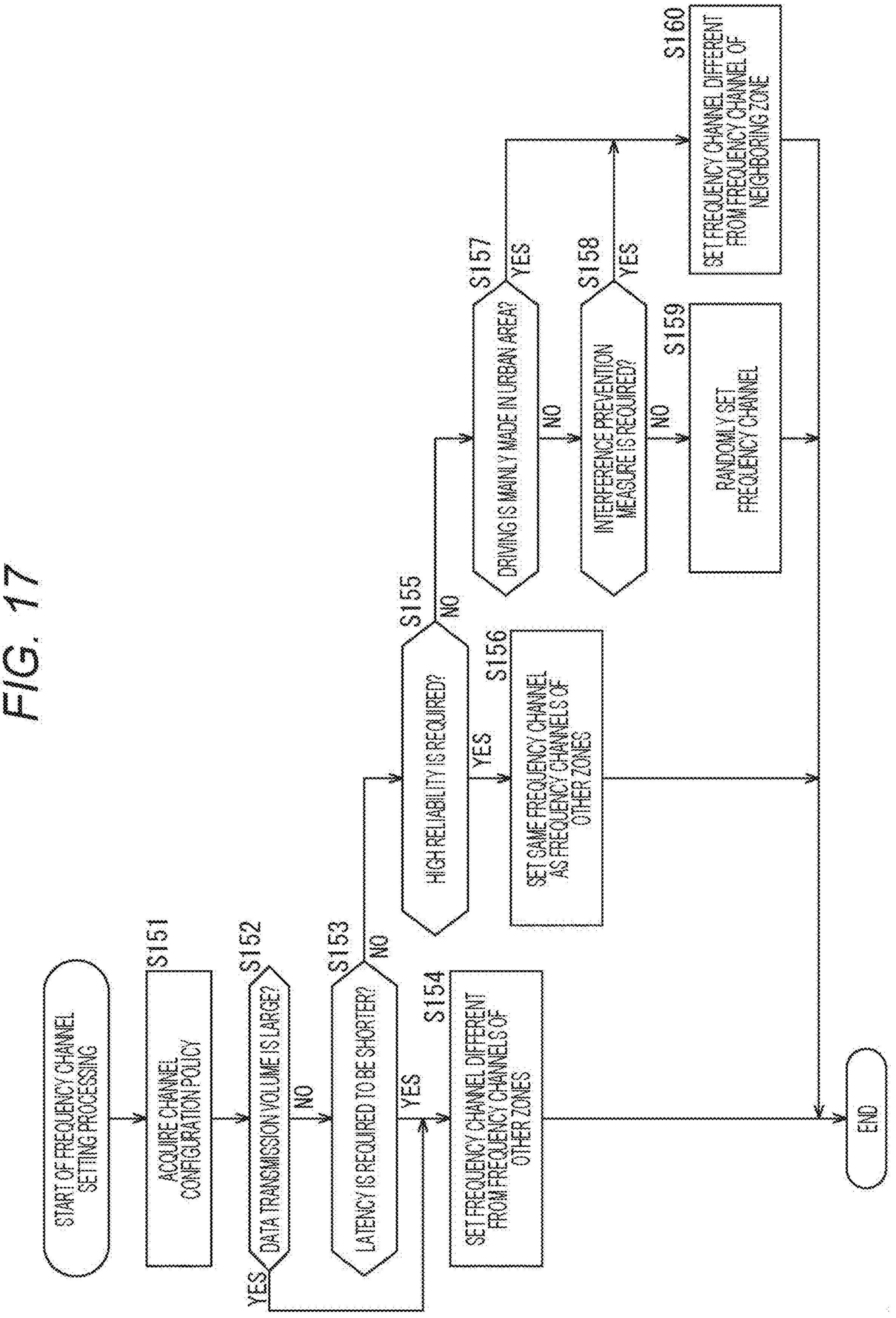
FIG. 17 is a flowchart for describing frequency channel setting processing.

Next, frequency channel setting processing that is performed in a case where the communication device 401 operates as an AP will be described with reference to a flowchart in FIG. 17.

This processing is performed at a predetermined timing in a case where the communication device 401 operates as an AP. For example, the processing is performed at the time of factory shipment and is periodically performed while the vehicle 1 is running.

In step S151, the channel control unit 512 acquires a channel configuration policy. The channel configuration policy is input from the input module 411 by the user, for example.

In step S152, the channel control unit 512 determines whether or not the data transmission volume is large. For example, in a case where a predicted value of the data transmission volume in the local zone is less than a predetermined threshold, the channel control unit 512 determines that the data transmission volume is small, and the processing proceeds to step S153.

In step S153, the channel control unit 512 determines whether or not the latency is required to be shorter. For example, in a case where allowable latency in the local zone is less than a predetermined threshold, the channel control unit 512 determines that the latency is required to be shorter, and the processing proceeds to step S154. This is, for example, a case where data requiring real-time processing is transmitted in the local zone.

On the other hand, in step S152, for example, in a case where the predicted value of the data transmission volume in the local zone is equal to or greater than the predetermined threshold, the channel control unit 512 determines that the data transmission volume is large, the process in step S153 is skipped, and the processing proceeds to step S154. This is, for example, a case where large data such as image data is transmitted in the local zone.

In step S154, the channel control unit 512 sets a frequency channel different from frequency channels of the other zones. Specifically, the channel control unit 512 communicates with the other zone control nodes 302 via the first network communication module 412, and sets, in coordination with the other zone control nodes 302, a frequency channel on which the second network communication module 413 (wireless LAN communication module 441) performs wireless communication, so that a different frequency channel is set for each zone.

Figure 18:
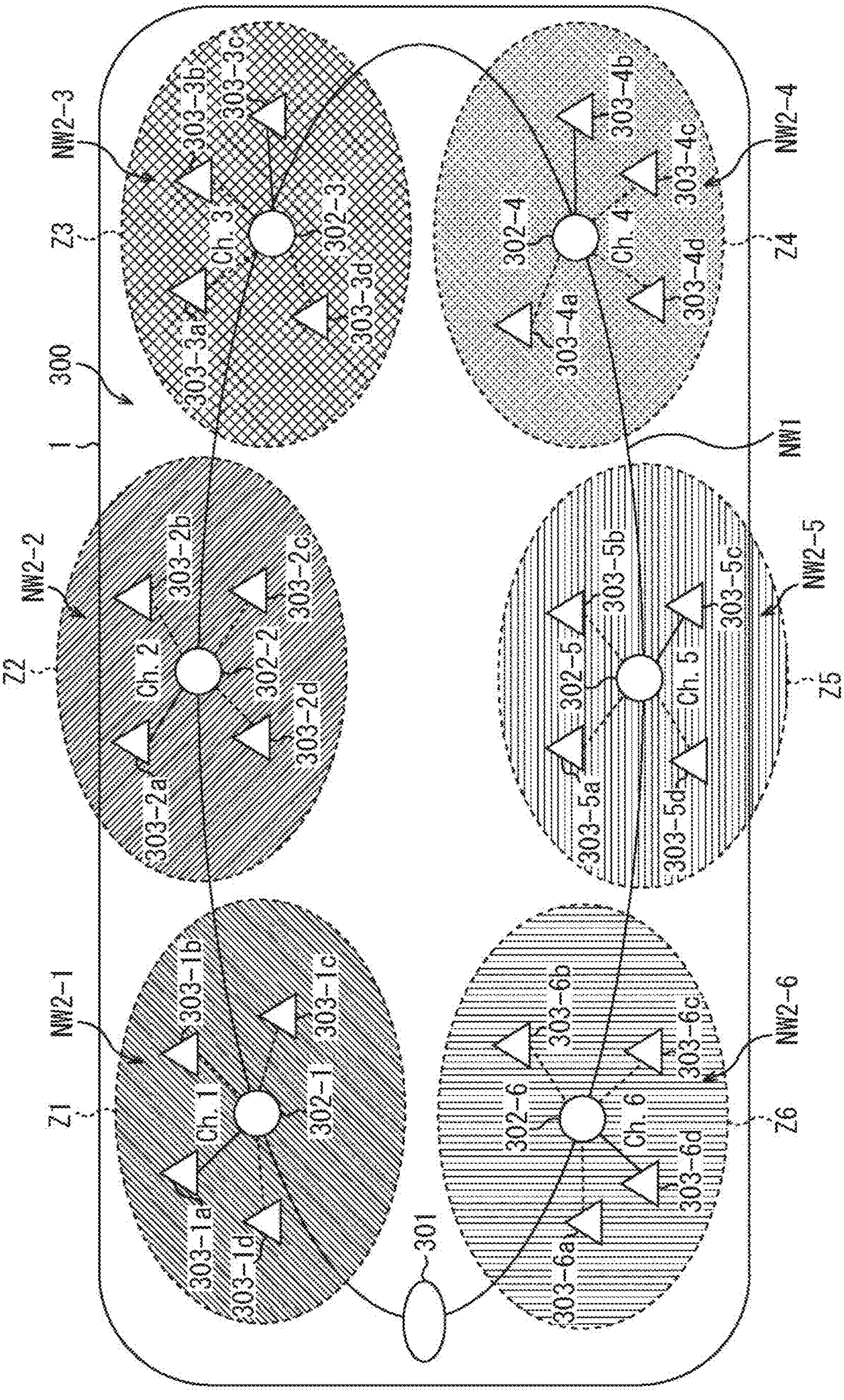
FIG. 18 is a diagram depicting a setting example of a frequency channel of each zone.

Accordingly, for example, as depicted in FIG. 18, a different frequency channel is set for each zone. Specifically, in this example, the zone Z1 is set with a frequency channel 1. The zone Z2 is set with a frequency channel 2. The zone Z3 is set with a frequency channel 3. The zone Z4 is set with a frequency channel 4. The zone Z5 is set with a frequency channel 5. The zone Z6 is set with a frequency channel 6.

With this configuration, data is transmitted using a different frequency channel in each zone, so that it is possible to suppress interference or hindrance between zones, and increase the data transmission volume in each zone.

Furthermore, since interference or hindrance between zones is suppressed, different data can be simultaneously transmitted in each zone. It is therefore possible to transmit, without delay, data that requires real-time transmission.

Moreover, since interference or hindrance between zones is suppressed, the reliability of data transmission in each zone is improved.

Thereafter, the frequency channel setting processing is brought to an end.

On the other hand, for example, in a case where the allowable latency in the local zone is equal to or greater than the predetermined threshold in step S153, the channel control unit 512 determines that the latency is not required to be shorter, and the processing proceeds to step S155.

In step S155, the channel control unit 512 determines whether or not high reliability is required. For example, in a case where an allowable transmission error rate in the local zone is less than a predetermined threshold, the channel control unit 512 determines that high reliability is required, and the processing proceeds to step S156.

In step S156, the channel control unit 512 sets the same frequency channel as the frequency channels of the other zones. Specifically, the channel control unit 512 communicates with the other zone control nodes 302 via the first network communication module 412, and sets, in coordination with the other zone control nodes 302, the frequency channel on which the second network communication module 413 (wireless LAN communication module 441) performs wireless communication identical to the frequency channels of the other zone.

Figure 19:
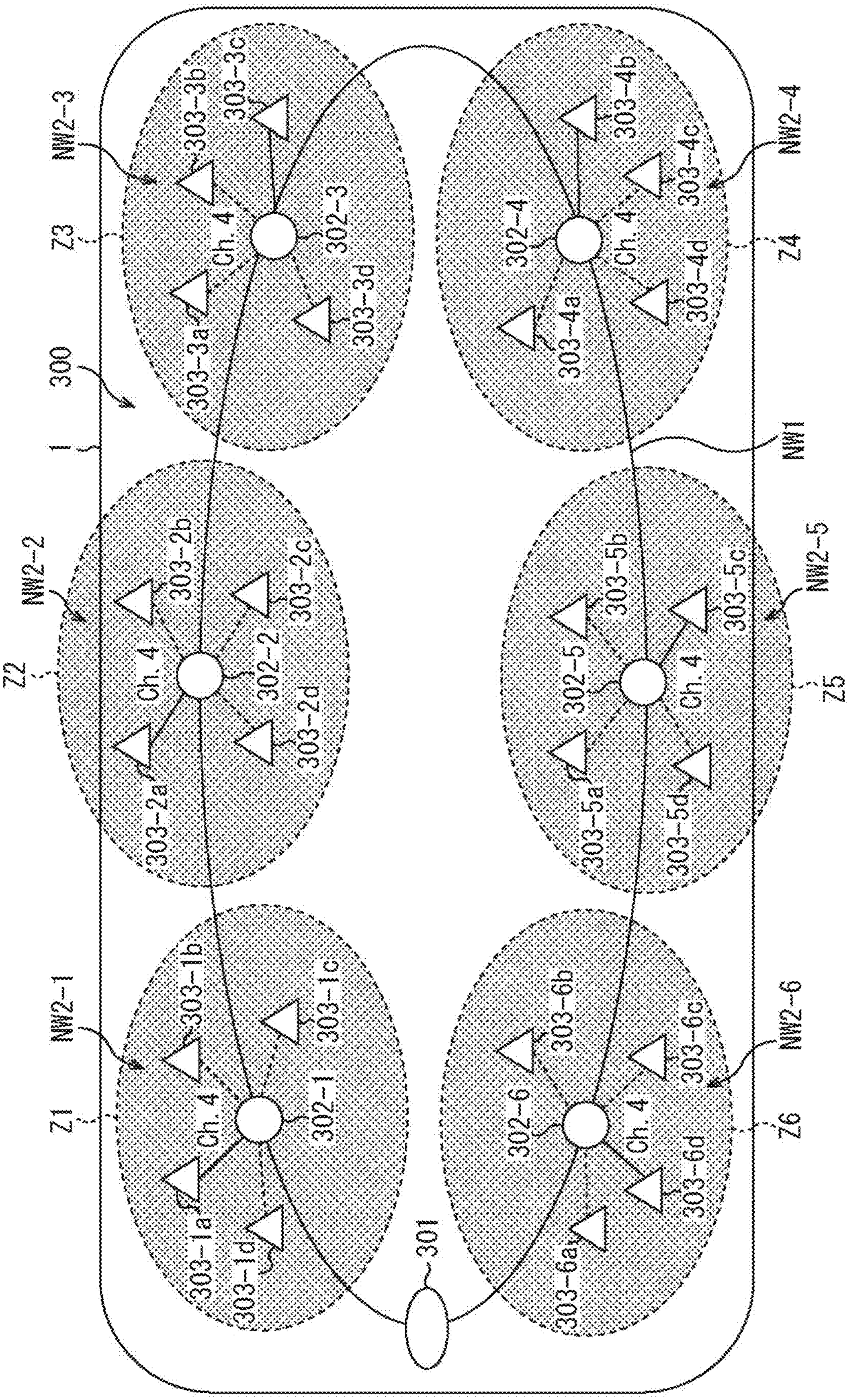
FIG. 19 is a diagram depicting a setting example of a frequency channel of each zone.

Accordingly, for example, as depicted in FIG. 19, all the zones are set with the same frequency channel. Specifically, in this example, all the zones Z1 to Z6 are set with the frequency channel 4.

With this configuration, in a case where data transmission is performed in a neighboring zone, data different from the data in the neighboring zone cannot be transmitted in the local zone in order to prevent interference or hindrance between zones, and data transmission efficiency decreases accordingly. On the other hand, since the same data can be simultaneously transmitted via the plurality of zone control nodes 302, data requiring high reliability can be efficiently transmitted.

Furthermore, since only one frequency channel is used, the probability of an overlap with the frequency channels used by the in-vehicle networks of the neighboring vehicles decreases. As a result, the probability of the occurrence of interference or hindrance from the in-vehicle networks of the neighboring vehicles decreases.

Thereafter, the frequency channel setting processing is brought to an end.

On the other hand, for example, in a case where the allowable transmission error rate in the local zone is equal to or greater than the predetermined threshold in step S155, the channel control unit 512 determines that high reliability is not required, and the processing proceeds to step S157.

In step S157, the channel control unit 512 determines whether or not driving is mainly made in an urban area. For example, in a case where the channel control unit 512 determines that driving is not mainly made in an urban area on the basis of a travel plan of the vehicle 1 or the like, the processing proceeds to step S158.

In step S158, the channel control unit 512 determines whether or not an interference prevention measure is required. For example, in a case where there is no other vehicle near the vehicle 1, and there is a low possibility that interference or hindrance from the in-vehicle networks of the other vehicles becomes a problem, the channel control unit 512 determines that no interference prevention measure is required, and the processing proceeds to step S159.

In step S159, the channel control unit 512 randomly sets a frequency channel. Specifically, the channel control unit 512 randomly sets the frequency channel on which the second network communication module 413 (wireless LAN communication module 441) performs wireless communication. As described above, a frequency channel of each zone is randomly set, particularly in a case where no channel configuration policy is required.

Thereafter, the frequency channel setting processing is brought to an end.

On the other hand, for example, in a case where there is another vehicle near the vehicle 1 due to a traffic jam or the like, and there is a high possibility that interference or hindrance from the in-vehicle networks of the other vehicles becomes a problem in step S158, the channel control unit 512 determines that the interference prevention measure is required, and the processing proceeds to step S160.

Furthermore, in a case where it is determined in step S157 that driving is mainly made in an urban area, the processing proceeds to step S160.

In step S160, the channel control unit 512 sets a frequency channel different from the frequency channels of the neighboring zones. Specifically, the channel control unit 512 communicates with the other zone control nodes 302 via the first network communication module 412, and sets, in coordination with the other zone control nodes 302, the frequency channel on which the second network communication module 413 (wireless LAN communication module 441) performs wireless communication different from the frequency channels of the neighboring zones.

Figure 20:
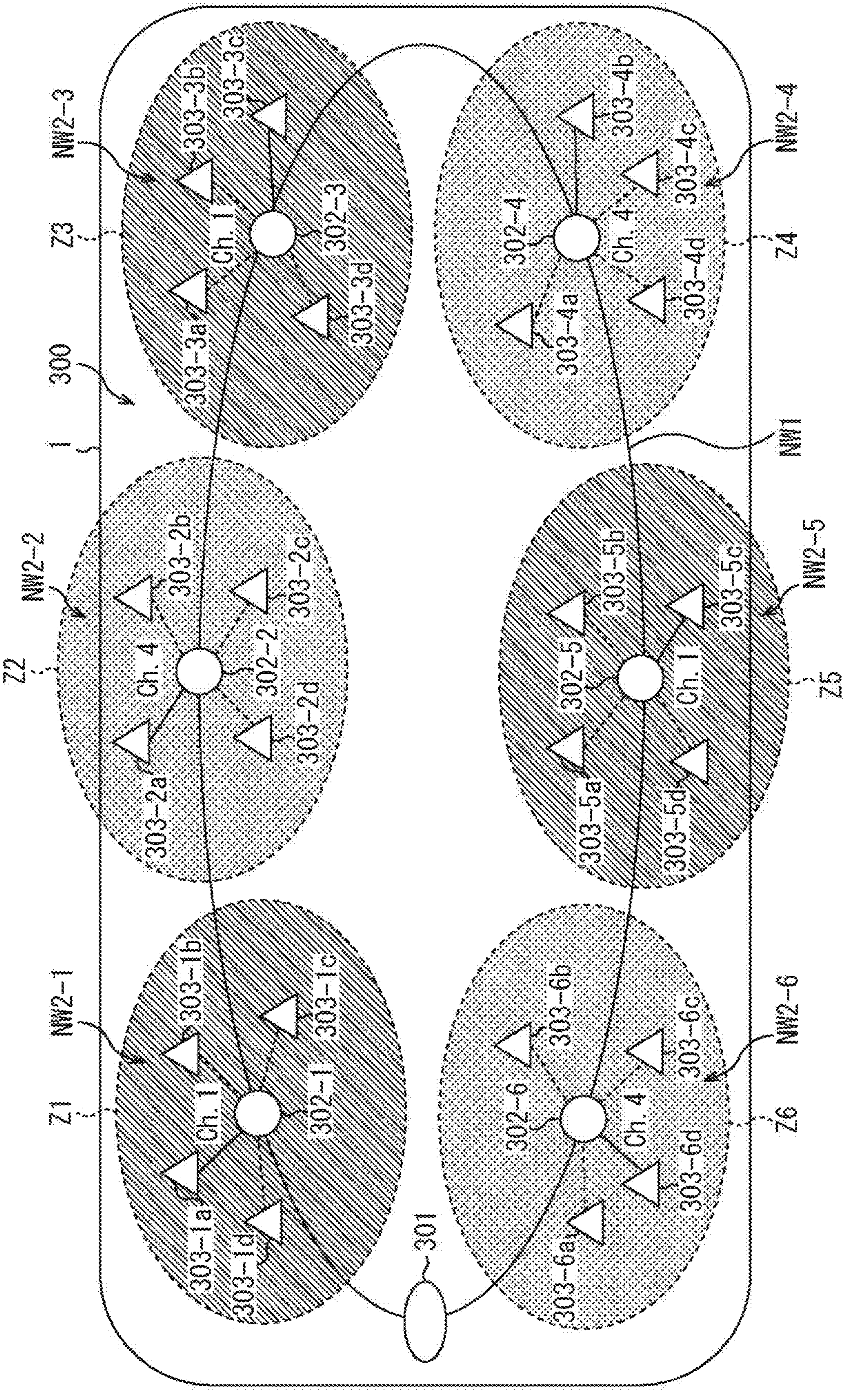
FIG. 20 is a diagram depicting a setting example of a frequency channel of each zone.

Accordingly, for example, as depicted in FIG. 20, different frequency channels are set between the neighboring zones. Specifically, in this example, the zone Z1, the zone Z3, and the zone Z5 are set with the frequency channel 1. The zone Z2, the zone Z4, and the zone Z6 are set with the frequency channel 4.

With this configuration, interference or hindrance between the neighboring zones is suppressed, which allows different data to be roughly simultaneously transmitted in each zone. It is therefore possible to reduce a delay in data transmission that requires real-time transmission.

Furthermore, narrowing down frequency channels to be used to two types decreases the probability of an overlap with the frequency channels used by the in-vehicle network of the neighboring vehicles. As a result, the probability of the occurrence of interference or hindrance from the in-vehicle networks of the neighboring vehicles decreases. Furthermore, even if one frequency channel overlaps with the in-vehicle networks of the neighboring vehicles, the other frequency channel is avoided from overlapping.

Thereafter, the frequency channel setting processing is brought to an end.

<AP Connection Processing>

Figure 21:
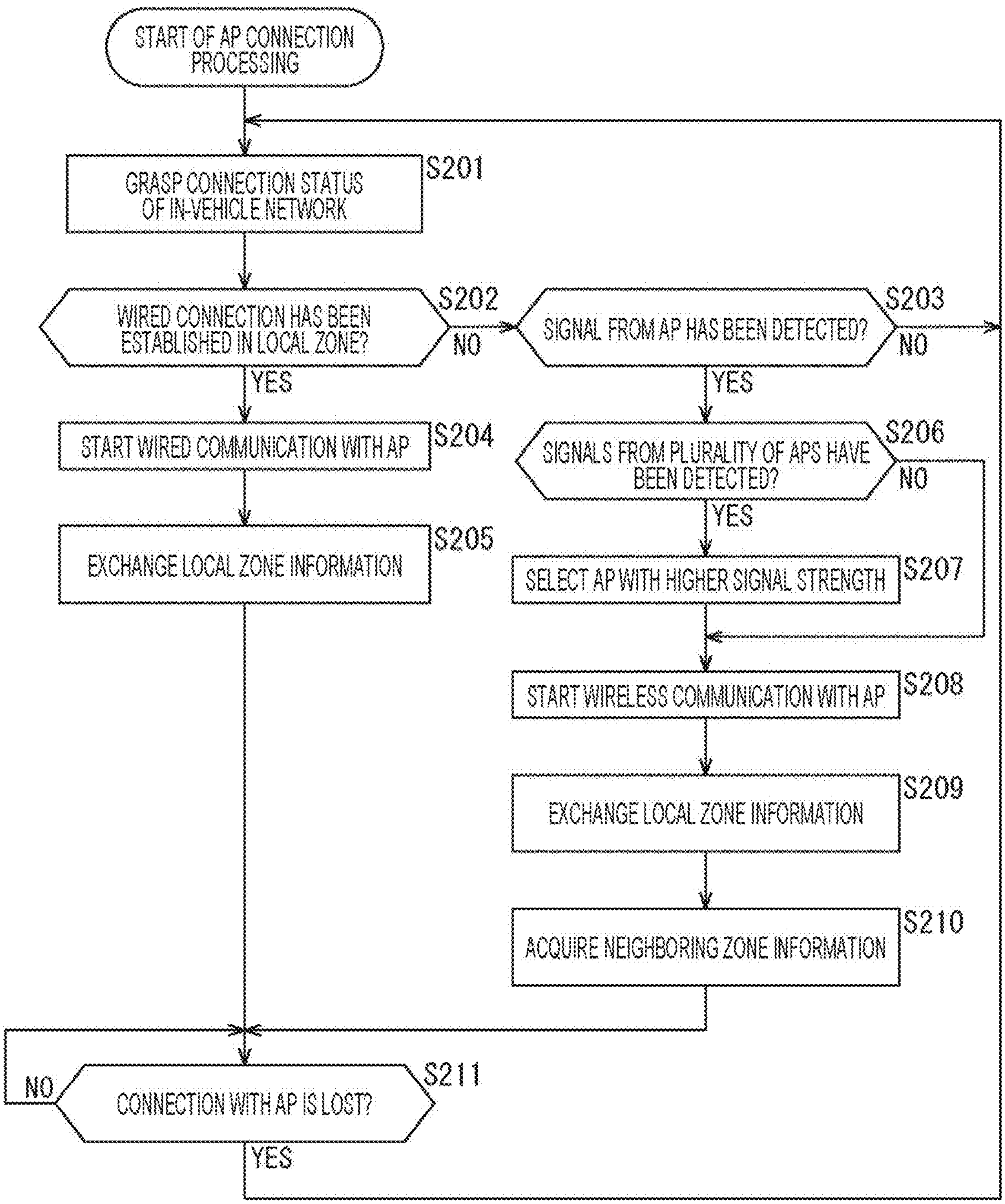
FIG. 21 is a flowchart for describing AP connection processing.

Next, AP connection processing that is performed in a case where the communication device 401 act as the device node 303 will be described with reference to a flowchart in FIG. 21.

Figure 14:
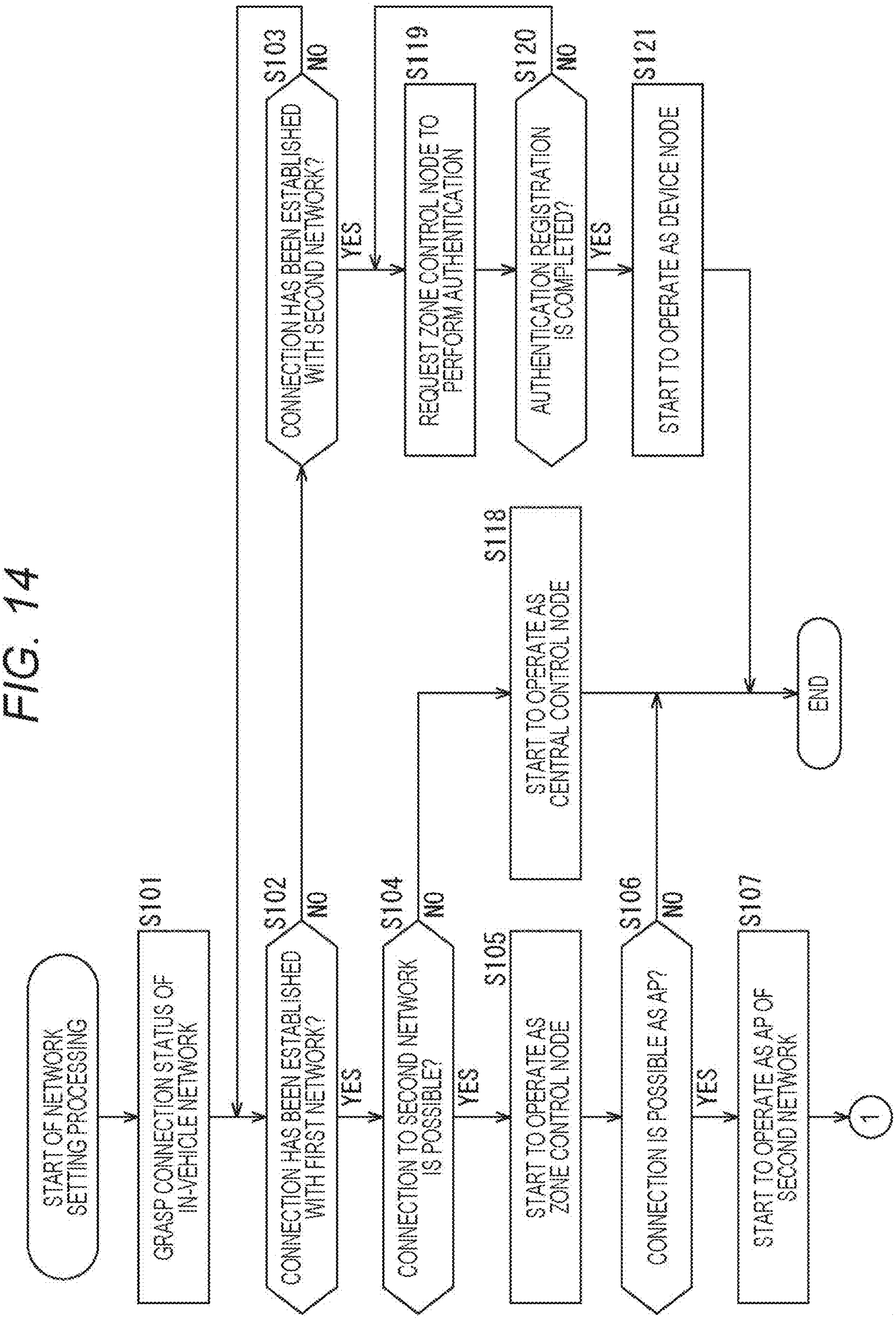
FIG. 14 is a flowchart for describing network setting processing.
Figure 15:
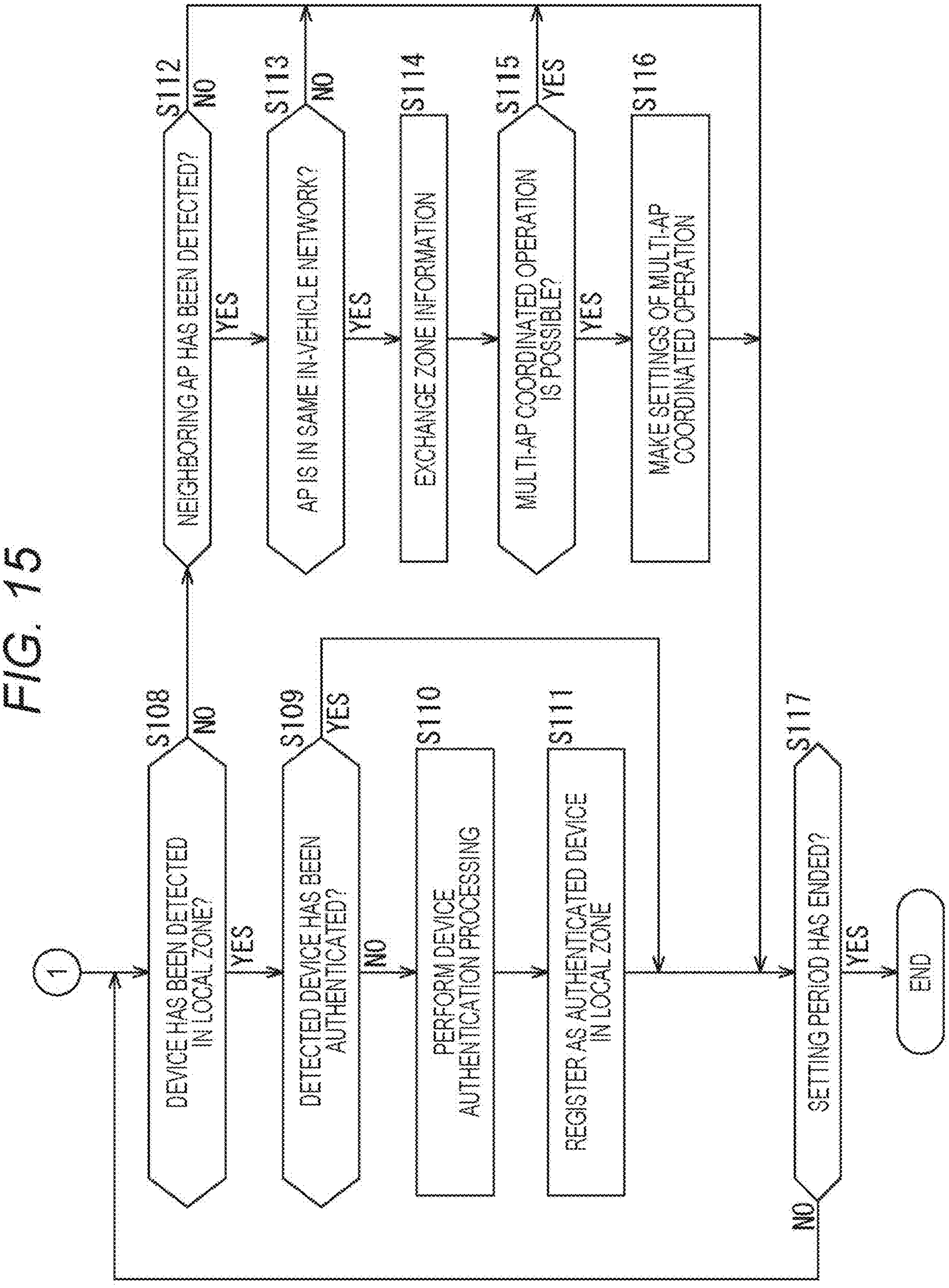
FIG. 15 is a flowchart for describing the network setting processing.

This processing is performed while the power to the communication device 401 is on after the role of the communication device 401 is set so as to cause the communication device 401 to act as the device node 303 in the network setting processing in FIG. 14, for example.

In step S201, the connection status of the in-vehicle network is grasped in a manner similar to the process in step S101 in FIG. 14.

In step S202, the network setting unit 511 determines whether or not there is a wired connection established in the local zone on the basis of information from the second network communication module 413. In a case where it is determined that there is no wired connection established in the local zone, the processing proceeds to step S203.

In step S203, the network setting unit 511 determines whether or not a signal from an AP (zone control node 302) has been detected on the basis of information from the second network communication module 413. In a case where it is determined that no signal from an AP has been detected, the processing returns to step S201.

Thereafter, the processes in steps S201 to S203 are repeatedly performed until it is determined in step S202 that there is a wired connection established in the local zone or it is determined in step S203 that a signal from an AP has been detected.

On the other hand, in a case where it is determined in step S202 that there is a wired connection established in the local zone, the processing proceeds to step S204.

In step S204, the dedicated communication module 442 of the second network communication module 413 starts wired communication with the AP in the local zone connected by wire under the control of the network setting unit 511. That is, in a case where the dedicated communication module 442 is connected to the AP by wire, wired communication is performed with the AP in preference to wireless communication.

In step S205, the network setting unit 511 communicates with the AP via the dedicated communication module 442 and exchanges the local zone information. For example, the network setting unit 511 transmits information regarding its own device (communication device 401) to the AP, and receives, from the AP, the local zone information described above with reference to FIG. 13.

Thereafter, the processing proceeds to step S211.

On the other hand, in a case where it is determined in step S203 that a signal from an AP has been detected, the processing proceeds to step S206.

In step S206, the network setting unit 511 determines whether or not signals from a plurality of APs have been detected on the basis of information from the second network communication module 413. In a case where it is determined that signals from a plurality of APs have been detected, the processing proceeds to step S207.

In step S207, the network setting unit 511 selects an AP with higher signal strength. For example, the network setting unit 511 selects an AP with highest signal strength among the plurality of APs from which signals have been detected by the second network communication module 413.

Thereafter, the processing proceeds to step S208.

On the other hand, in a case where it is determined in step S206 that only a signal from one AP has been detected, the process in step S207 is skipped, and the processing proceeds to step S208.

In step S208, the wireless LAN communication module 441 of the second network communication module 413 starts wireless communication with the AP under the control of the network setting unit 511.

Specifically, in a case where signals from a plurality of APs have been detected, the wireless LAN communication module 441 starts wireless communication with the AP with highest signal strength. That is, the AP with highest signal strength is recognized as an AP in the local zone, and wireless communication is started.

On the other hand, in a case where only a signal from one AP has been detected, the wireless LAN communication module 441 starts wireless communication with the AP.

In step S209, the network setting unit 511 communicates with the AP via the wireless LAN communication module 441 to exchange the local zone information in a manner similar to the process in step S205.

In step S210, the network setting unit 511 communicates with the AP via the wireless LAN communication module 441 to acquire the neighboring zone information. For example, the network setting unit 511 receives, from the AP, the neighboring zone information described above with reference to FIG. 10.

Thereafter, the processing proceeds to step S211.

In step S211, the network setting unit 511 determines whether or not the connection with the AP is lost on the basis of information from the second network communication module 413. This determination process is repeatedly performed until it is determined that the connection with the AP is lost. In a case where it is determined that the connection with the AP is lost, the processing returns to step S201.

Thereafter, the processes in step S201 and the subsequent steps are performed. That is, processing of reestablishing a connection with an AP is performed, and for example, processing of establishing a connection with an AP different from the AP whose connection is lost is performed.

As described above, in a case where the communication device 401 acts as the device node 303, the communication device 401 automatically searches for an AP and starts communication with a detected AP. Furthermore, in a case where the connection with an AP with which the communication device 401 is communicating is lost, the communication device 401 searches for another AP and starts communication with a detected AP.

<Data Transmission Processing>

Figure 22:
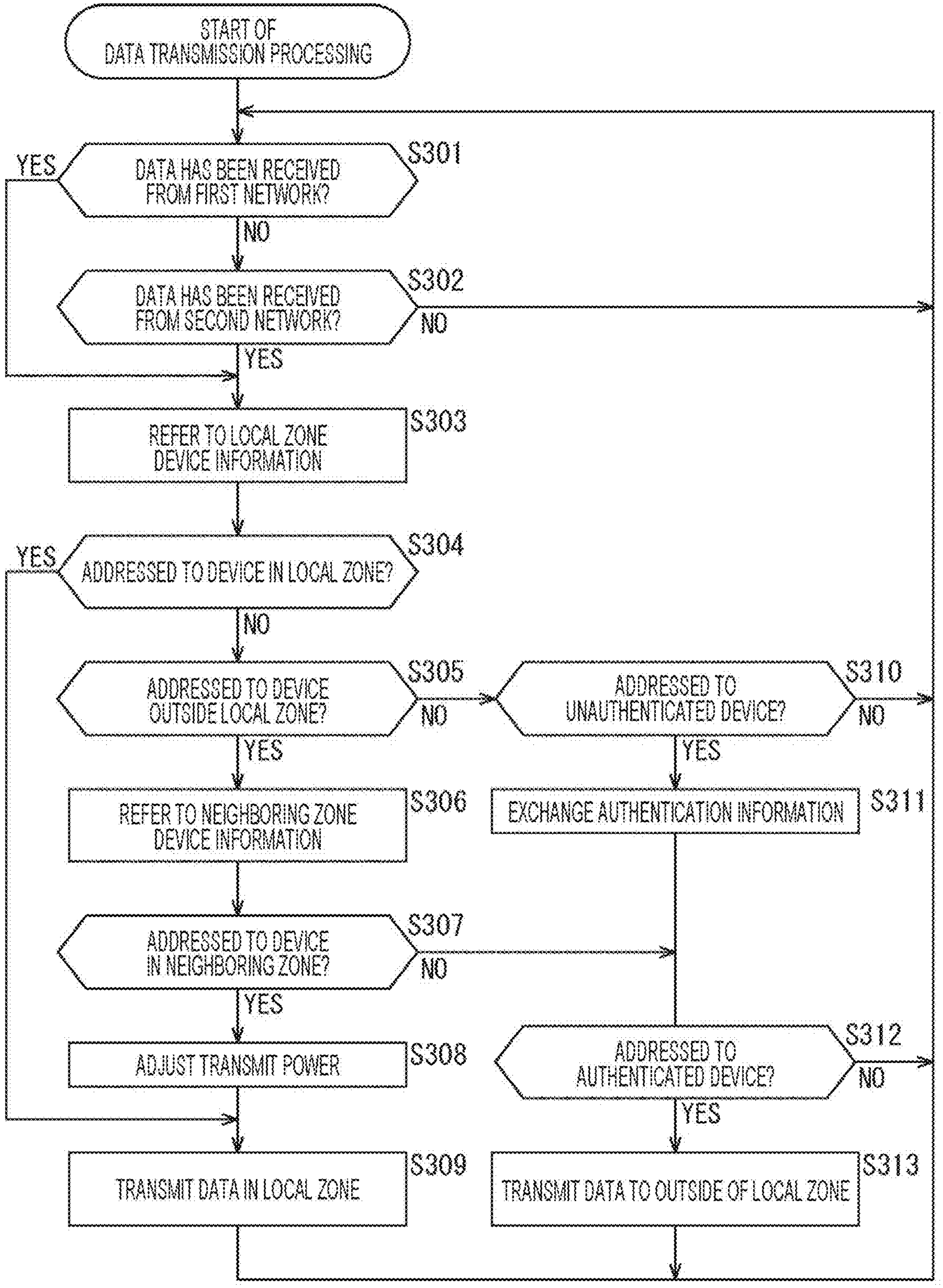
FIG. 22 is a flowchart for describing data transmission processing.

Next, data transmission processing that is performed in a case where the communication device 401 operates as the zone control node 302 (AP) will be described with reference to a flowchart in FIG. 22.

This processing is performed while the power to the communication device 401 is on after the role of the communication device 401 is set so as to cause the communication device 401 to act as an AP in the network setting processing in FIG. 14, for example.

In step S301, the transmission control unit 514 determines whether or not data has been received from the first network NW1 on the basis of information from the first network communication module 412. In a case where it is determined that no data has been received from the first network NW1, the processing proceeds to step S302.

In step S302, the transmission control unit 514 determines whether or not data has been received from the second network NW2 on the basis of information from the second network communication module 413. In a case where it is determined that no data has been received from the second network NW2, the processing returns to step S301.

Thereafter, the processes in steps S301 and S302 are repeatedly performed until it is determined in step S301 that data has been received from the first network NW1 or it is determined in step S302 that data has been received from the second network NW2.

On the other hand, in a case where it is determined in step S301 that data has been received from the first network NW1 or in a case where it is determined in step S302 that the data has been received from the second network NW2, the processing proceeds to step S303.

In step S303, the transmission control unit 514 refers to local zone device information.

In step S304, the transmission control unit 514 determines whether or not it is addressed to a device in the local zone. In a case where it is determined that it is not addressed to any device in the local zone, the processing proceeds to step S305.

In step S305, the transmission control unit 514 determines whether or not it is addressed to a device outside the local zone. In a case where it is determined that it is addressed to a device outside the local zone, the processing proceeds to step S306.

In step S306, the transmission control unit 514 refers to neighboring zone device information.

In step S307, the transmission control unit 514 determines whether or not it is addressed to a device in a neighboring zone. In a case where it is determined that it is addressed to a device in a neighboring zone, the processing proceeds to step S308.

In step S308, the power control unit 513 adjusts the transmit power. For example, the power control unit 513 adjusts the transmit power of the wireless LAN communication module 441 so as to cause the device node 303 in the neighboring zone to which the data is addressed to fall within the communication range of the wireless LAN communication module 441.

Accordingly, the local zone becomes larger, which allows the communication device 401 acting as an AP to transmit the data to the device node 303 to which the data is addressed. As a result, for example, in a case where a failure occurs in an AP in a neighboring zone, the device node 303 in the neighboring zone can continue data transmission.

Figure 23:
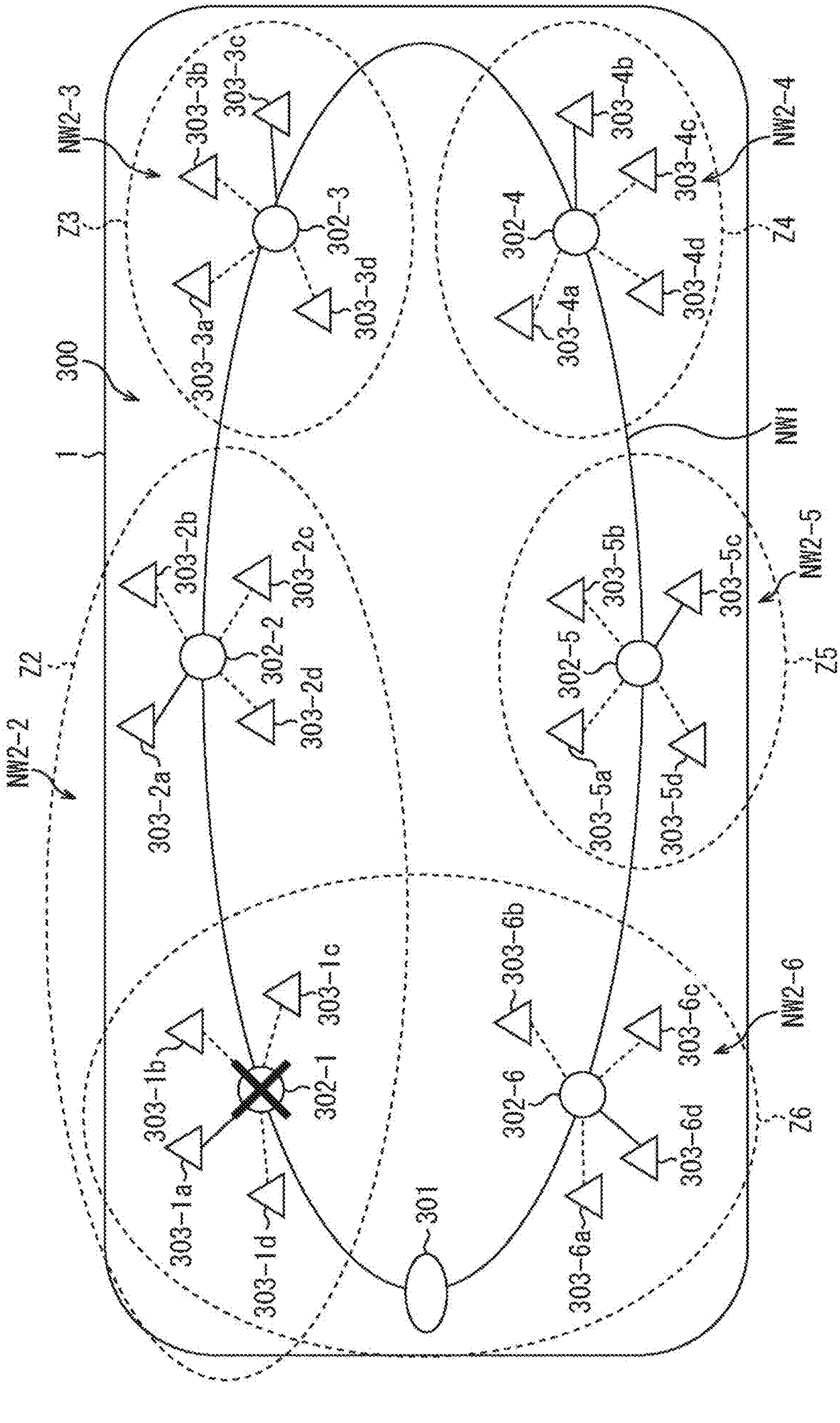
FIG. 23 is a diagram depicting a setting example of a zone.

Specifically, for example, as depicted in FIG. 23, in a case where a failure occurs in the zone control node 302-1, the device nodes 303-1*a* to 303-1*d* in the zone Z1 cannot transmit data to other device nodes 303.

On the other hand, for example, the zone control node 302-2 increases the transmit power so as to cause the device nodes 303-1*a* to 303-1*d* to fall within the zone Z2. It is therefore possible for the device nodes 303-1*a* to 303-1*d* to communicate with other device nodes 303 via the zone control node 302-2.

Similarly, for example, the zone control node 302-6 increases the transmit power so as to cause the device nodes 303-1*a* to 303-1*d* to fall within the zone Z6. It is therefore possible for the device nodes 303-1*a* to 303-1*d* to communicate with other device nodes 303 via the zone control node 302-6.

With this configuration, the reliability of data transmission in the communication system 300 is improved.

Thereafter, the processing proceeds to step S309.

On the other hand, in a case where it is determined in step S304 that it is addressed to a device in the local zone, the processes in steps S305 to S308 are skipped, and the processing proceeds to step S309.

In step S309, the communication device 401 transmits the data in the local zone. Specifically, in a case where the destination device node 304 is connected with the dedicated communication module 442 by wire, the dedicated communication module 442 transmits the data to the device node 304 by wired communication under the control of the transmission control unit 514. On the other hand, in a case where the destination device node 304 is wirelessly connected to the wireless LAN communication module 441, the wireless LAN communication module 441 transmits the data to the device node 304 by wireless communication under the control of the transmission control unit 514.

Thereafter, the processing returns to step S301, and the processes in step S301 and the subsequent steps are performed.

On the other hand, in a case where it is determined in step S307 that it is not addressed to any device in neighboring zones, for example, in a case where it is addressed to a device in a remote zone in the vehicle 1 different from the neighboring zones, the processing proceeds to step S312.

Furthermore, in a case where it is determined in step S305 that it is not addressed to any device outside the local zone, the processing proceeds to step S310.

In step S310, the transmission control unit 514 determines whether or not it is addressed to an unauthenticated device. In a case where it is determined that it is addressed to an unauthenticated device, the processing proceeds to step S311.

In step S311, the transmission control unit 514 exchanges authentication information with the destination device via the first network communication module 412.

Thereafter, the processing proceeds to step S312.

In step S312, the transmission control unit 514 determines whether or not it is addressed to an authenticated device. In a case where it is determined that it is addressed to an authenticated device, the processing proceeds to step S313.

In step S313, the communication device 401 transmits the data to the outside of the local zone. Specifically, the Ethernet communication module 431 transmits the data to the first network NW1 under the control of the transmission control unit 514. Accordingly, the data is transmitted, over the first network NW1, to the zone control node 302 (AP) of the zone (network) in which the destination device node 303 is present.

Thereafter, the processing returns to step S301, and the processes in step S301 and the subsequent steps are performed.

On the other hand, in a case where it is determined in step S312 that it is not addressed to any authenticated device, the data is not transmitted, the processing returns to step S301, and the processes in step S301 and the subsequent steps are performed. This prevents unnecessary data transmission.

Furthermore, in a case where it is determined in step S310 that it is not addressed to any unauthenticated device, the processing returns to step S301, and the processes in step S301 and the subsequent steps are performed. This is, for example, a case where the data is addressed to a device not connected to any zone control node 302 or a device that should not be connected such as a device of another vehicle. This prevents unnecessary data transmission.

Thereafter, the processing returns to step S301, and the processes in step S301 and the subsequent steps are performed.

As described above, the communication device 401 acting as an AP switches the transfer destination of the data to the first network NW1 or the second network NW2 in accordance with the destination of the data, and transmits the data to the device node 303 as the final destination.

Furthermore, in a case where it is addressed to the device node 303 in a neighboring zone, the communication device 401 acting as an AP can directly transmit the data to the device node 303 by increasing the transmit power of the wireless LAN communication module 441. With this configuration, for example, even if a failure occurs in the AP in the neighboring zone, the device node 303 in the zone can continue communication.

Figure 24:
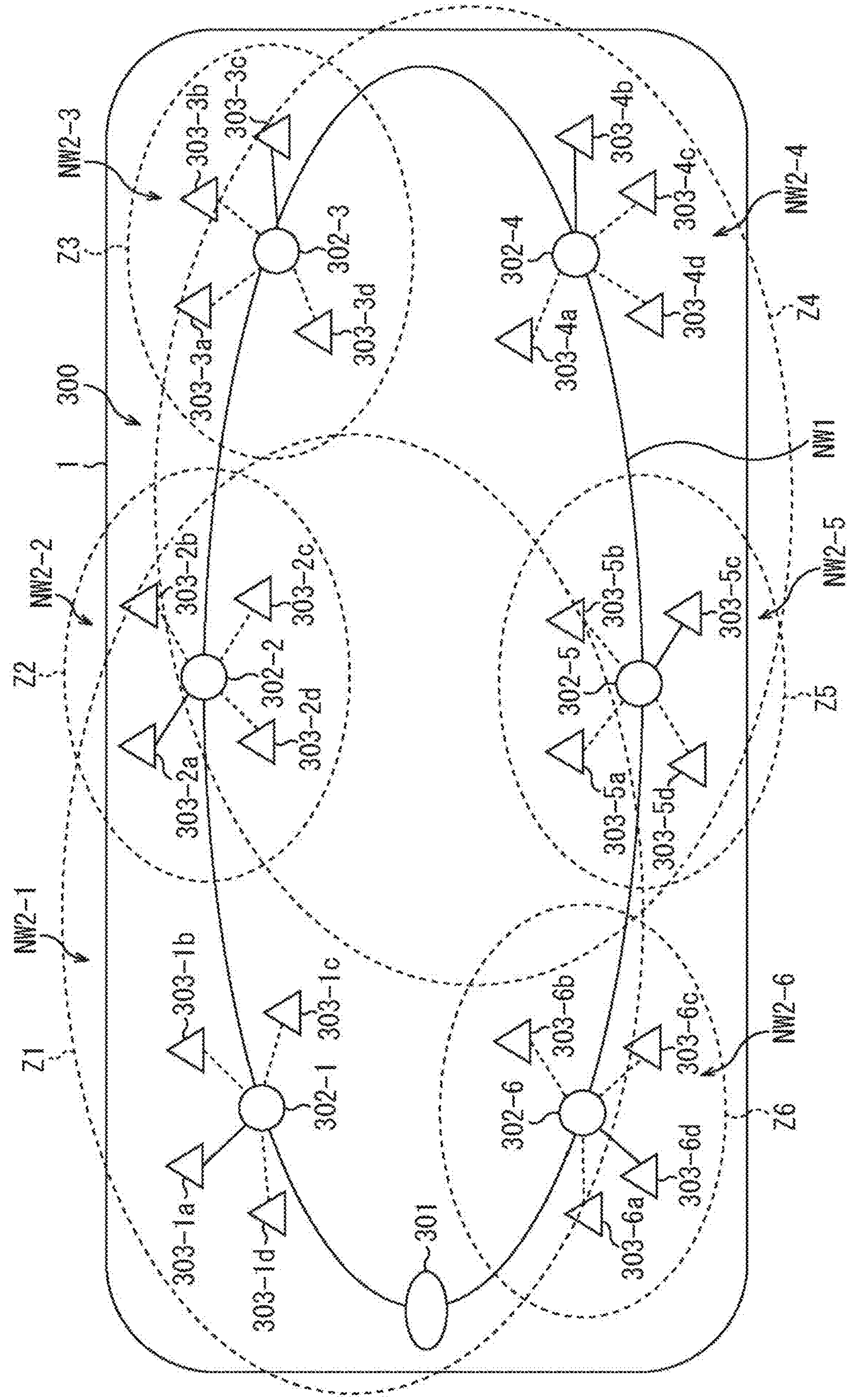
FIG. 24 is a diagram depicting a setting example of a zone.

Note that, for example, as depicted in FIG. 24, regardless of whether or not a failure occurs in the zone control node 302, in a normal state, some zone control nodes 302 each increase the transmit power to make a corresponding zone (communication range) larger to overlap with a neighboring zone, so that the zone control node 302 can serve as a backup of the AP in the neighboring zone.

For example, in this example, the zone Z1 is set larger to overlap with the zones Z2, 25, and Z6. Accordingly, the zone control node 302-1 in the zone Z1 can serve as a backup of the zone control nodes 302 (APs) in the zones Z2, 25, and Z6. That is, the zone control node 302-1 in the zone Z1 can operate as an AP for device nodes 303 present in a range in which the zone Z1 overlaps with the zones Z2, 25, and Z6, instead of the zone control nodes 302 (APs) in the zones Z2, 25, and Z6.

Furthermore, the zone Z4 is set larger to overlap with the zones Z2, 23, and Z5. Accordingly, the zone control node 302-4 in the zone Z4 can serve as a backup of the zone control nodes 302 (APs) in the zones Z2, 3, and Z5. That is, the zone control node 302-4 in the zone Z4 can operate as an AP for device nodes 303 present in a range in which the zone Z4 overlaps with the zones Z2, Z3, and Z5, instead of the zone control nodes 302 (APs) in the zones Z2, 23, and Z5.

With this configuration, the reliability of the entire communication system 300 is improved.

Furthermore, a device node 303 present in a plurality of zones is configured as a multi-access point, so that the coordinated transmission technology is applicable to the device node 303. For example, the zone control nodes 302 in the zones in which the device node 303 is present can transmit the same data to the device node 303. Accordingly, data can be delivered to the device node 303 with higher reliability.

Here, an example of a procedure of data transmission in the communication system 300 in FIG. 24 will be described with reference to sequence diagrams in FIGS. 25 and 26.

First, an example of a procedure of transmitting data between a device node 303 belonging to both the zones Z1 and Z2 (hereinafter, referred to as a device A) and a device node 303 belonging to the zone Z3 (hereinafter, referred to as a device B) will be described with reference to a sequence diagram in FIG. 25.

Note that the zone control node 302-1 in the zone Z1 is hereinafter referred to as an AP 1. The zone control node 302-2 in the zone Z2 is hereinafter referred to as an AP 2. The zone control node 302-3 in the zone Z3 is hereinafter referred to as an AP 3.

Figure 25:
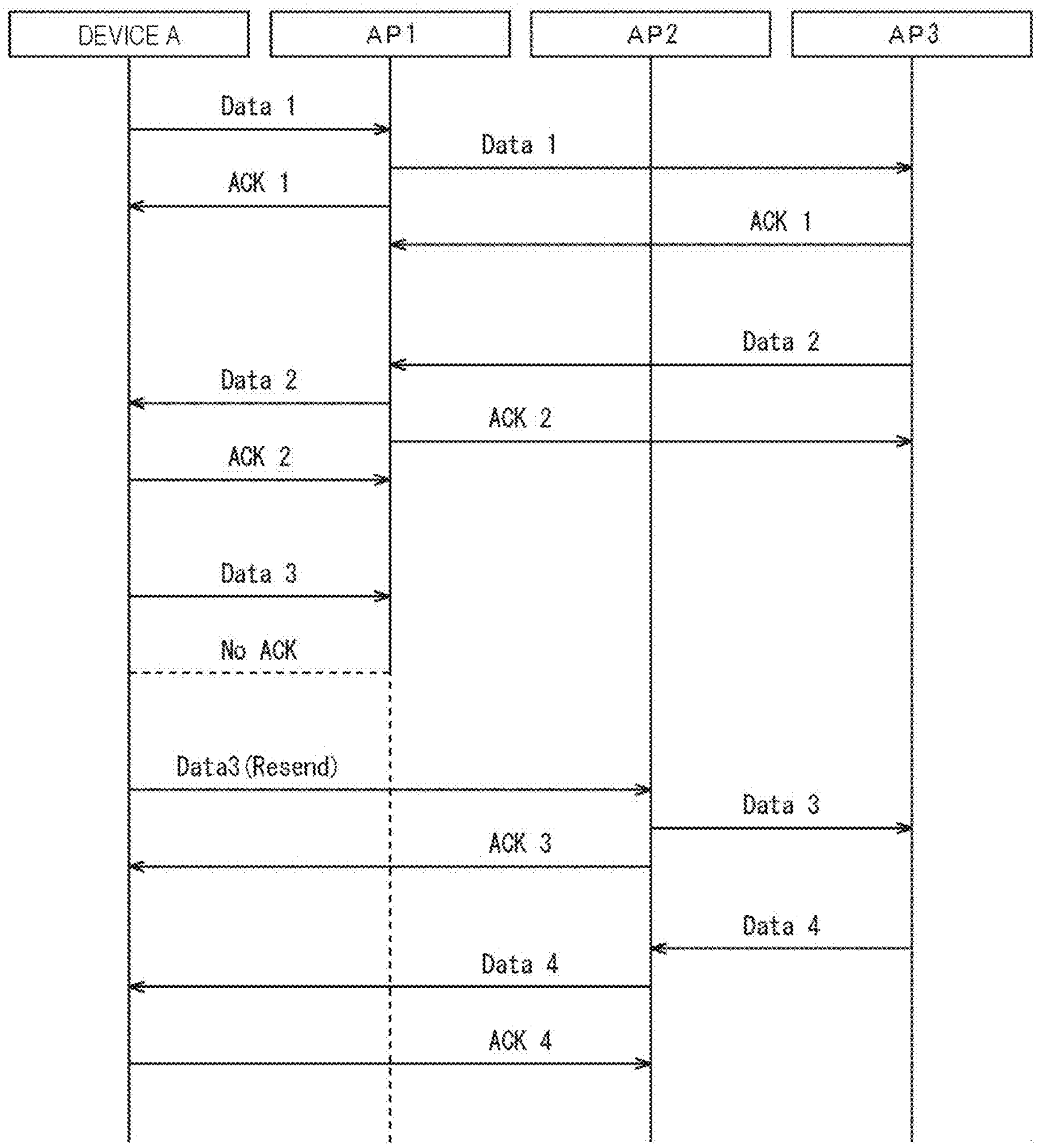
FIG. 25 is a sequence diagram depicting a data transmission flow when a failure occurs in data transmission.
Figure 26:
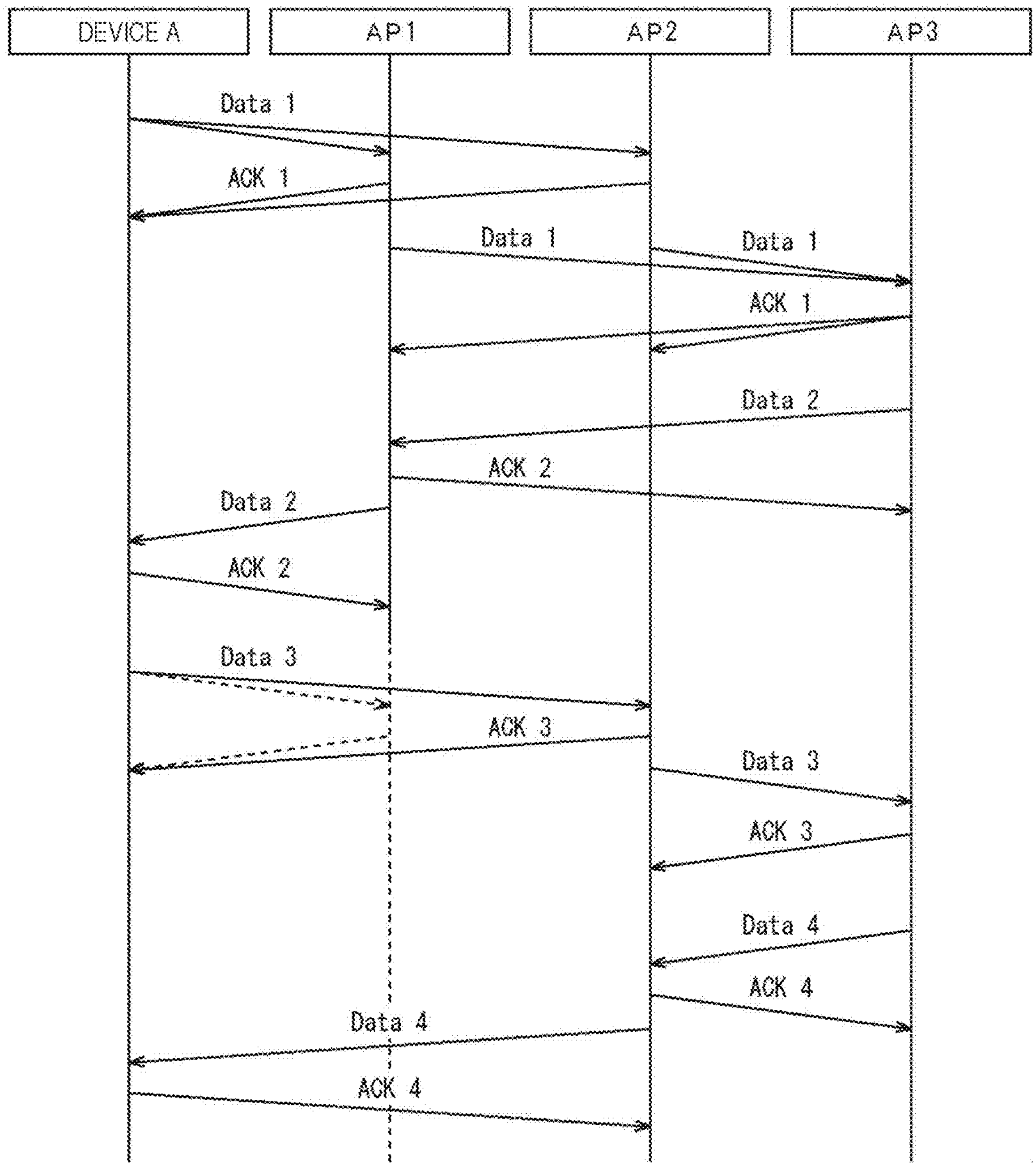
FIG. 26 is a sequence diagram depicting a data transmission flow during coordinated operation.

Note that, in FIG. 25, a procedure of data transmission between the AP 3 and the device B is not shown, and the description thereof will be omitted as appropriate.

First, the device A transmits Data 1 to the AP 1 over the second network NW2-1.

In response to the above, the AP 1 returns ACK 1, which is an acknowledgment of receipt of the Data 1, to the device A over the second network NW2-1. Furthermore, the AP 1 transfers the Data 1 to the AP 3 over the first network NW1.

In response to the above, the AP 3 returns ACK 1, which is an acknowledgment of receipt of the Data 1, to the AP 1 over the first network NW1. Furthermore, although not illustrated, the AP 3 transmits the Data 1 to the device B over the second network NW2-3.

In response to the above, although not illustrated, the device B returns ACK 1, which is an acknowledgment of receipt of the Data 1, to the AP 3 over the second network NW2-3.

Next, although not illustrated, the device B transmits Data 2 to the AP 3 over the second network NW2-3.

In response to the above, although not illustrated, the AP 3 returns ACK 2, which is an acknowledgment of receipt of the Data 2, to the device B over the second network NW2-3. Furthermore, the AP 3 transfers the Data 2 to the AP 1 over the first network NW1.

In response to the above, the AP 1 returns ACK 2, which is an acknowledgment of receipt of the Data 2, to the AP 3 over the first network NW1. Furthermore, the AP 1 transfers the Data 2 to the device A over the second network NW2-1.

In response to the above, the device A returns ACK 2, which is an acknowledgment of receipt of the Data 2, to the AP 1 over the second network NW2-1.

Next, the device A transmits Data 3 to the AP 1 over the second network NW2-1.

Here, for example, it is assumed that a failure occurs in data transmission between the device A and the AP 1. In this case, the device A cannot receive ACK 3, which is an acknowledgment of receipt of the Data 3, from the AP 1, so that the device A retransmits the Data 3 to the AP 2 over the second network NW2-2.

In response to the above, the AP 2 returns ACK 3, which is an acknowledgment of receipt of the Data 3, to the device A over the second network NW2-2. Furthermore, the AP 2 transfers the Data 3 to the AP 3 over the first network NW1.

In response to the above, the AP 3 returns ACK 2, which is an acknowledgment of receipt of the Data 2, to the AP 2 over the first network NW1. Furthermore, although not illustrated, the AP 3 transmits the Data 3 to the device B over the second network NW2-3.

In response to the above, although not illustrated, the device B returns ACK 3, which is an acknowledgment of receipt of the Data 3, to the AP 3 over the second network NW2-3.

Next, although not illustrated, the device B transmits Data 4 to the AP 3 over the second network NW2-3.

In response to the above, although not illustrated, the AP 3 returns ACK 4, which is an acknowledgment of receipt of the Data 4, to the device B over the second network NW2-3. Furthermore, the AP 3 transfers the Data 4 to the AP 2 over the first network NW1.

In response to the above, the AP 2 returns ACK 4, which is an acknowledgment of receipt of the Data 4, to the AP 3 over the first network NW1. Furthermore, the AP 2 transfers the Data 4 to the device A over the second network NW2-2.

In response to the above, the device A returns ACK 4, which is an acknowledgment of receipt of the Data 4, to the AP 2 over the second network NW2-2.

As described above, even if a failure occurs in the data transmission between the AP 1 and the device A, the AP 2 can continue the data transmission between the device A and the device B by performing the data transmission with the device A instead of the AP 1.

Next, an example of a procedure of transmitting data between the device A belonging to both the zone Z1 and the zone Z2 and the device B belonging to the zone Z3 using the coordinated transmission technology will be described with reference to a sequence diagram in FIG. 26.

The device A transmits Data 1 to the AP 1 over the second network NW2-1, and transmits the Data 1 to the AP 2 over the second network NW2-2.

In response to the above, the AP 1 returns ACK 1, which is an acknowledgment of receipt of the Data 1, to the device A over the second network NW2-1. Furthermore, the AP 1 transfers the Data 1 to the AP 3 over the first network NW1.

Furthermore, the AP 2 returns ACK 2, which is an acknowledgment of receipt of Data 2, to the device A over the second network NW2-2. Moreover, the AP 2 transfers the Data 2 to the AP 3 over the first network NW1.

In response to the above, the AP 3 returns ACK 1, which is an acknowledgment of receipt of the Data 1, to the AP 1 and the AP 2 over the first network NW1. Furthermore, although not illustrated, the AP 3 transmits the Data 1 to the device B over the second network NW2-3.

In response to the above, although not illustrated, the device B returns ACK 1, which is an acknowledgment of receipt of the Data 1, to the AP 3 over the second network NW2-3.

Next, although not illustrated, the device B transmits Data 2 to the AP 3 over the second network NW2-3.

In response to the above, although not illustrated, the AP 3 returns ACK 2, which is an acknowledgment of receipt of the Data 2, to the device B over the second network NW2-3. Furthermore, the AP 3 transfers the Data 2 to the AP 1 over the first network NW1.

In response to the above, the AP 1 returns ACK 2, which is an acknowledgment of receipt of the Data 2, to the AP 3 over the first network NW1. Furthermore, the AP 1 transfers the Data 2 to the device A over the second network NW2-1.

In response to the above, the device A returns ACK 2, which is an acknowledgment of receipt of the Data 2, to the AP 1 over the second network NW2-1.

Next, the device A transmits Data 3 to the AP 1 over the second network NW2-1, and transmits the Data 3 to the AP 2 over the second network NW2-2.

Here, it is assumed that a failure occurs in the data transmission between the AP 1 and the device A. In this case, the AP 2 has successfully received the Data 3, so that the AP 2 returns ACK 3, which is an acknowledgment of receipt of the Data 3, to the device A over the second network NW2-2. Furthermore, the AP 2 transfers the Data 3 to the AP 3 over the first network NW1.

In response to the above, the AP 3 returns ACK 3, which is an acknowledgment of receipt of the Data 3, to the AP 2 over the first network NW1. Furthermore, although not illustrated, the AP 3 transmits the Data 3 to the device B over the second network NW2-3.

In response to the above, although not illustrated, the device B returns ACK 3, which is an acknowledgment of receipt of the Data 3, to the AP 3 over the second network NW2-3.

Next, the device B transmits Data 4 to the AP 3 over the second network NW2-3.

In response to the above, although not illustrated, the AP 3 returns ACK 4, which is an acknowledgment of receipt of the Data 4, to the device B over the second network NW2-3. Furthermore, the AP 3 transfers the Data 4 to the AP 2 over the first network NW1.

In response to the above, the AP 2 returns ACK 4, which is an acknowledgment of receipt of the Data 4, to the AP 3 over the first network NW1. Furthermore, the AP 2 transfers the Data 4 to the device A over the second network NW2-2.

In response to the above, the device A returns ACK 4, which is an acknowledgment of receipt of the Data 4, to the AP 2 over the second network NW2-2.

As described above, even if a failure occurs in the data transmission between the AP 1 and the device A, the data transmission between the device A and the device B can be continued via the AP 2.

As described above, to the communication system 300 of the vehicle 1, a zone-type architecture formed by combining the first network NW1 that is a wired network and the second network NW2 that is a wireless network is applied, which makes the in-vehicle network flexible. Furthermore, a general-purpose wired network technology can be applied to the first network NW1, and a general-purpose wireless network technology can be applied to the second network NW2, so that it is possible to implement the in-vehicle network at low cost.

Then, between the zones, data transmission is performed over the first network NW1 that is a backbone network, and in each zone, data transmission is performed over the second network NW2. With this configuration, traffic is distributed, and data transmission efficiency in the communication system 300 in the vehicle 1 is improved accordingly.

Furthermore, the frequency channel of each zone can be individually controlled as the situation demands. It is therefore possible to increase the data transmission volume in each zone, improve the reliability of data transmission, and reduce a data transmission delay. Furthermore, it is possible to suppress interference or hindrance from an in-vehicle network of a neighboring vehicle.

Moreover, the transmit power of each zone control node 302 (AP) can be individually controlled as the situation demands. As a result, limiting the communication range of each zone makes it possible to suppress interference or hindrance between zones and vehicles and to prevent data leakage, data interception, and the like to improve security. Furthermore, causing the respective communication ranges of the zones to overlap with each other makes it possible to provide a backup of APs between zones or to apply a multi-AP coordinated transmission technology, and it is therefore possible to improve the reliability of data transmission.

Furthermore, the use of a wireless network makes it possible to add, even if a new device is added into the vehicle 1, for example, the device to the in-vehicle network without laying a dedicated signal line.

Moreover, for example, connecting a device that requires high-reliable and real-time data transmission to the zone control node 302 by wire makes it possible to improve the reliability of the data transmission and to speed up the data transmission.

4. Modification Example

Hereinafter, modification examples of the above-described embodiment of the present technology will be described.

Although the example where the first network NW1 is of a link type has been described above, any network topology such as a bus topology or a star topology can be applied.

The present technology can also be applied to, for example, a communication system in a moving body other than a vehicle.

5. Others

<Configuration Example of Computer>

The above-described series of processing can be performed by hardware or software. In a case where the series of pieces of processing is performed by software, a program constituting the software is installed in a computer. Here, the computer includes a computer incorporated in dedicated hardware, a general-purpose personal computer capable of executing various functions by installing various programs, and the like, for example.

Figure 27:
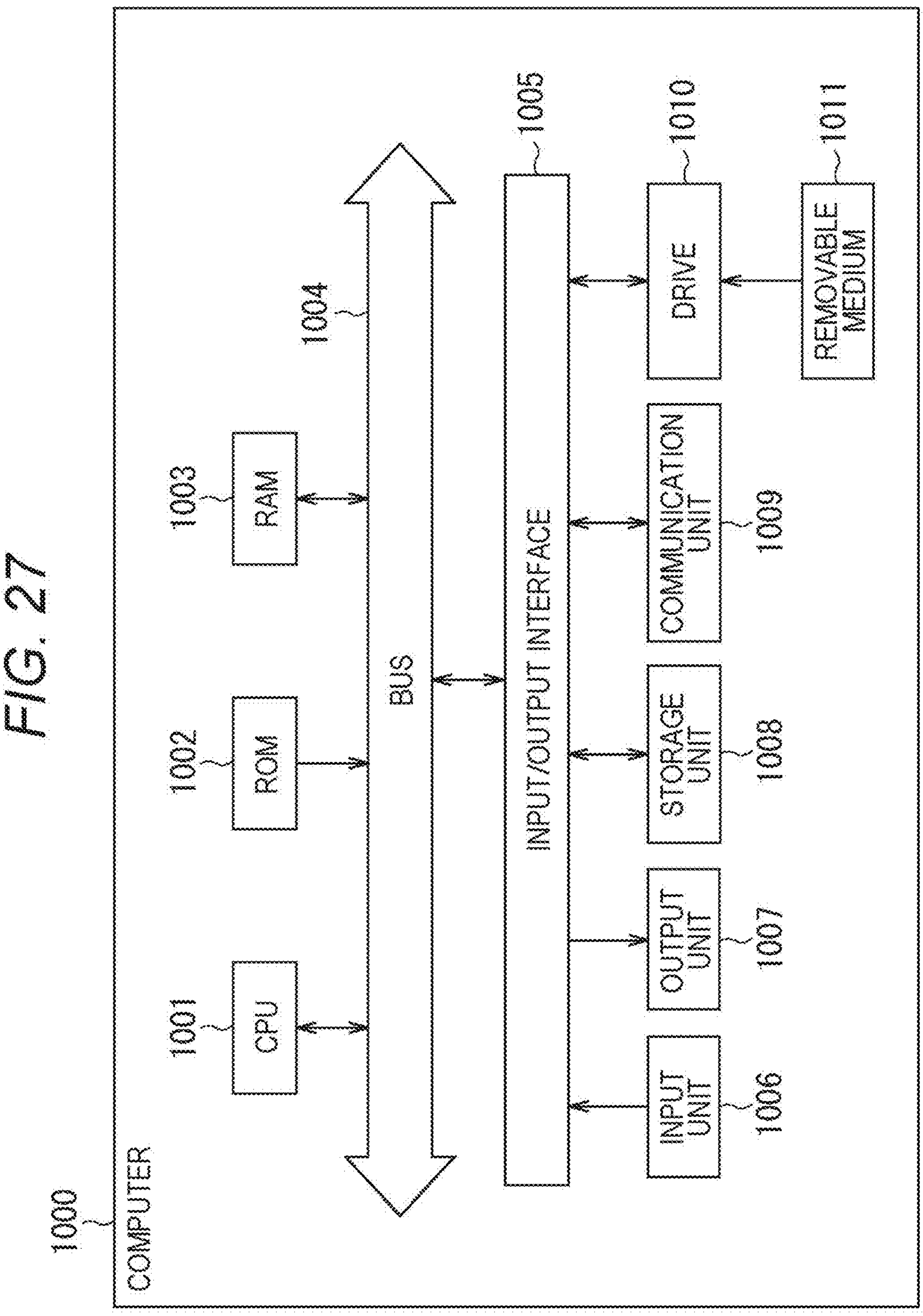
FIG. 27 is a diagram depicting a configuration example of a computer.

FIG. 27 is a block diagram depicting a configuration example of hardware of a computer that performs the above-described series of processing by a program.

In a computer 1000, a central processing unit (CPU) 1001, a read only memory (ROM) 1002, and a random access memory (RAM) 1003 are mutually connected by a bus 1004.

An input/output interface 1005 is further connected to the bus 1004. An input unit 1006, an output unit 1007, a recording unit 1008, a communication unit 1009, and a drive 1010 are connected to the input/output interface 1005.

The input unit 1006 includes an input switch, a button, a microphone, an imaging element, and the like. The output unit 1007 includes a display, a speaker, and the like. The recording unit 1008 includes a hard disk, a nonvolatile memory, and the like. The communication unit 1009 includes a network interface and the like. The drive 1010 drives a removable medium 1011 such as a magnetic disk, an optical disc, a magneto-optical disk, or a semiconductor memory.

In the computer 1000 configured as described above, for example, the CPU 1001 loads a program recorded in the recording unit 1008 into the RAM 1003 via the input/output interface 1005 and the bus 1004 and executes the program, whereby the above-described series of processing is performed.

The program executed by the computer 1000 (CPU 1001) can be provided by being recorded in the removable medium 1011 as a package medium or the like, for example. Furthermore, the program can be provided via a wired or wireless transmission medium such as a local area network, the Internet, or digital satellite broadcasting.

In the computer 1000, the program can be installed in the recording unit 1008 via the input/output interface 1005 by attaching the removable medium 1011 to the drive 1010. Furthermore, the program can be received by the communication unit 1009 via a wired or wireless transmission medium and installed in the recording unit 1008. Furthermore, the program can be installed in advance in the ROM 1002 or the recording unit 1008.

Note that the program executed by the computer may be a program by which processing is performed in time series in the order described herein, or may be a program by which processing is performed in parallel or at necessary timing such as when a call is made or the like.

Furthermore, herein, a system means a set of a plurality of components (devices, modules (parts), or the like), and it does not matter whether or not all the components are in the same housing. Therefore, a plurality of devices housed in separate housings and connected via a network and one device in which a plurality of modules is housed in one housing are both systems.

Moreover, the embodiments of the present technology are not limited to the above-described embodiments, and various modifications can be made without departing from the gist of the present technology.

For example, the present technology may be configured as cloud computing in which a function is shared by a plurality of devices through the network to process together.

Furthermore, each step described in the above-described flowchart can be performed by one device or performed by a plurality of devices in a shared manner.

Moreover, in a case where a plurality of processes is included in one step, the plurality of processes included in one step can be performed by one device or by a plurality of devices in a shared manner.

<Combination Examples of Configurations>

The present technology can also have the following configurations.

(1)

A communication device including:

a first communication unit configured to perform communication over a first network that interconnects a plurality of zones in a vehicle; and a second communication unit configured to perform wireless communication over a second network formed in a first zone that is one of the plurality of zones.

(2)

The communication device described in (1), in which the second network is a wireless network, and the communication device operates as an access point of the second network.

(3)

The communication device described in (2), in which a communication range of the second communication unit overlaps with a communication range of an access point of a third network that is a wireless network formed in a second zone near the first zone.

(4)

The communication device described in (3), in which the second communication unit operates in coordination with the access point of the third network.

(5)

The communication device described in (4), in which the second communication unit performs, in coordination with the access point of the third network, data transmission with another communication device present in a range in which the communication range of the second communication unit and the communication range of the access point of the third network overlap with each other.

(6)

The communication device described in any one of (3) to (5), in which the second communication unit performs data transmission with another communication device present in a range in which the communication range of the second communication unit and the communication range of the access point of the third network overlap with each other in a case where a failure occurs in data transmission between the another communication device and the access point of the third network.

(7)

The communication device described in any one of (2) to (6), further including a channel control unit configured to control a frequency channel of the second communication unit on the basis of at least one of a communication condition of the second network, a frequency channel of a wireless network formed in a neighboring zone of the first zone, or surroundings of the vehicle.

(8)

The communication device described in (7), in which the communication condition of the second network includes at least one of a data transmission volume, an allowable data delay time, or required data reliability.

(9)

The communication device described in any one of (2) to (8), further including a power control unit configured to control transmit power of the second communication unit in accordance with a communication status of a wireless network formed in a neighboring zone.

(10)

The communication device described in (9), in which in a case where a failure occurs in an access point in the neighboring zone, the power control unit increases the transmit power of the second communication unit so as to allow the second communication unit to communicate with another communication device in the neighboring zone.

(11)

The communication device described in any one of (2) to (10), in which the second communication unit performs wired communication with some of other communication devices constituting the second network.

(12)

The communication device described in any one of (1) to (11), in which the first network includes a wired network.

(13)

A communication method including:

performing, by a communication device, communication over a first network that interconnects a plurality of zones in a vehicle; and performing, by the communication device, wireless communication over a second network formed in a first zone that is one of the plurality of zones.

(14)

A communication device including a communication unit configured to communicate with an access point of a second network formed in a local zone that is one of a plurality of zones in a vehicle, the plurality of zones being interconnected by a first network, and communicate with an access point of a third network present near the local zone.

(15)

The communication device described in (14), further including a network setting unit configured to exchange, with the access point of the local zone, information regarding the local zone and a neighboring zone of the local zone.

(16)

The communication device described in (14) or (15), further including a network setting unit configured to recognize, in a case where signals from a plurality of access points are detected, an access point with highest signal strength as the access point of the local zone.

(17)

The communication device described in any one of (14) to (16), in which the communication unit is connected by wire with the access point of the local zone.

(18)

The communication device described in any one of (14) to (17), in which processing of establishing a connection with another access point is performed in a case where a connection with the access point of the local zone is lost.

(19)

A communication method including performing, by a communication device, communication with an access point of a second network formed in a local zone that is one of a plurality of zones in a vehicle, the plurality of zones being interconnected by a first network, and performing, by the communication device, communication with an access point of a third network present near the local zone.

(20)

A vehicle including:

a first network that interconnects a plurality of zones; and a plurality of second networks, each of which including a wireless network formed in each of the zones.

Note that the effects described herein are merely examples and are not limited, and other effects may be provided.

REFERENCE SIGNS LIST

1 Vehicle
11 Vehicle control system
300 Communication system
301 Central control node
302-1 to 302-6 Zone control node
303-1*a* to 303-6*d* Device node
401 Communication device
412 First network communication module
413 Second network communication module
414 Control module
431 Ethernet communication module
441 Wireless LAN communication module
442 Dedicated communication module
501 Communication control unit
511 Network setting unit
512 Channel control unit
513 Power control unit
514 Transmission control unit

The invention claimed is:

1. A communication device comprising:

first communication circuitry configured to perform communication over a first network that interconnects a plurality of zones in a vehicle; and second communication circuitry configured to perform wireless communication over a second network formed in a first zone that is one of the plurality of zones, wherein the second network is a wireless network, the communication device operates as an access point of the second network, a communication range of the second communication circuitry overlaps with a communication range of an access point of a third network that is a wireless network formed in a second zone neighboring the first zone, and the second communication circuitry is configured to perform data transmission with another communication device present in a range in which the communication range of the second communication circuitry and the communication range of the access point of the third network overlap with each other in a case where a failure occurs in data transmission between the another communication device and the access point of the third network.

2. The communication device according to claim 1, wherein the second communication circuitry is configured to operate in coordination with the access point of the third network.

3. The communication device according to claim 2, wherein the second communication circuitry is configured to perform, in coordination with the access point of the third network, data transmission with the another communication device present in the range in which the communication range of the second communication circuitry and the communication range of the access point of the third network overlap with each other.

4. The communication device according to claim 1, further comprising processing circuitry configured to control a frequency channel of the second communication circuitry on a basis of at least one of a communication condition of the second network, a frequency channel of a wireless network formed in a neighboring zone of the first zone, or surroundings of the vehicle.

5. The communication device according to claim 4, wherein the communication condition of the second network includes at least one of a data transmission volume, an allowable data delay time, or required data reliability.

6. The communication device according to claim 1, further comprising processing circuitry configured to control transmit power of the second communication circuitry in accordance with a communication status of a wireless network formed in a neighboring zone.

7. The communication device according to claim 6, wherein in a case where a failure occurs in an access point in the neighboring zone, the processing circuitry is configured to increase the transmit power of the second communication circuitry so as to allow the second communication circuitry to communicate with another communication device in the neighboring zone.

8. The communication device according to claim 1, wherein the second communication circuitry is configured to perform wired communication with some of other communication devices constituting the second network.

9. The communication device according to claim 1, wherein the first network includes a wired network.

10. A communication method comprising:

performing, by a communication device, communication over a first network that interconnects a plurality of zones in a vehicle; and performing, by the communication device, wireless communication over a second network formed in a first zone that is one of the plurality of zones, wherein the second network is a wireless network, the communication device operates as an access point of the second network, a communication range of the communication device overlaps with a communication range of an access point of a third network that is a wireless network formed in a second zone neighboring the first zone, and the method further comprises performing, by the communication device, data transmission with another communication device present in a range in which the communication range of the communication device and the communication range of the access point of the third network overlap with each other in a case where a failure occurs in data transmission between the another communication device and the access point of the third network.

11. A communication device comprising:

communication circuitry configured to communicate with an access point of a second network formed in a local zone that is one of a plurality of zones in a vehicle, the plurality of zones being interconnected by a first network, and communicate with an access point of a third network present in a zone neighboring the local zone, wherein the second network is a wireless network, a communication range of the communication circuitry overlaps with a communication range of the access point of the third network, and the communication circuitry is configured to transmit data to the access point of the second network, and retransmit the data to the access point of the third network in a case where a failure occurs in data transmission between the communication circuitry and the access point of the second network, the failure being indicated by the communication circuitry not receiving, from the access point of the second network, an acknowledgment of receipt of the data.

12. The communication device according to claim 11, further comprising processing circuitry configured to exchange, with the access point of the local zone, information regarding the local zone and a neighboring zone of the local zone.

13. The communication device according to claim 11, further comprising processing circuitry configured to recognize, in a case where signals from a plurality of access points are detected, an access point with highest signal strength as the access point of the local zone.

14. The communication device according to claim 11, wherein the communication circuitry is connected by wire with the access point of the local zone.

15. The communication device according to claim 11, further comprising processing circuitry configured to establish a connection with another access point is performed in a case where a connection with the access point of the local zone is lost.

16. A communication method comprising:

performing, by a communication device, communication with an access point of a second network formed in a local zone that is one of a plurality of zones in a vehicle, the plurality of zones being interconnected by a first network, and performing, by the communication device, communication with an access point of a third network present in a zone neighboring the local zone, wherein the second network is a wireless network, a communication range of the communication device overlaps with a communication range of the access point of the third network, and the method further comprises transmitting, by the communication device, data to the access point of the second network, and retransmitting, by the communication device, the data to the access point of the third network in a case where a failure occurs in data transmission between the communication device and the access point of the second network, the failure being indicated by the communication device not receiving, from the access point of the second network, an acknowledgment of receipt of the data.

17. A vehicle comprising:

a first network that interconnects a plurality of zones; and a plurality of second networks, each of which is a wireless network formed in a respective one of the zones, wherein each of the plurality of second networks has an access point, a communication range of a first access point of a first one of the plurality of second networks overlaps with a communication range of a second access point of a second one of the plurality of second networks, and the first access point is configured to perform data transmission with a communication device present in a range in which the communication range of the first access point and the communication range of the second access point overlap with each other in a case where a failure occurs in data transmission between the communication device and the second access point.

* * * * *